US011748821B1

(12) United States Patent
Trahan et al.

(10) Patent No.: US 11,748,821 B1
(45) Date of Patent: Sep. 5, 2023

(54) SYSTEMS AND METHODS FOR MANAGING AND REDUCING SPENDING

(71) Applicant: UIPCO, LLC, San Antonio, TX (US)

(72) Inventors: Meagan Marie Trahan, San Antonio, TX (US); Ingeborg Burch, San Antonio, TX (US); Christine Catsifas, San Antonio, TX (US); Marty Lee Mendivil, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1027 days.

(21) Appl. No.: 15/380,053

(22) Filed: Dec. 15, 2016

Related U.S. Application Data

(60) Provisional application No. 62/368,098, filed on Jul. 28, 2016.

(51) Int. Cl.
*G06Q 40/12* (2023.01)
*G06Q 40/02* (2023.01)

(52) U.S. Cl.
CPC .......... *G06Q 40/12* (2013.12); *G06Q 40/02* (2013.01)

(58) Field of Classification Search
CPC ........ G06Q 40/12; G06Q 40/02; G06Q 40/10; G06Q 40/08
USPC .................................. 705/30, 35, 38, 39, 44
See application file for complete search history.

(56) References Cited

U.S. PATENT DOCUMENTS

| 5,313,571 | A | * | 5/1994 | Hirose | G06T 11/206 345/660 |
| 5,875,437 | A | * | 2/1999 | Atkins | G06Q 20/102 705/40 |
| 6,119,103 | A | * | 9/2000 | Basch | G06Q 20/4037 705/35 |
| 6,532,450 | B1 | * | 3/2003 | Brown | G06Q 20/00 705/40 |

(Continued)

FOREIGN PATENT DOCUMENTS

| AU | 2013200795 A1 * | 9/2013 | |
| KR | 20150104211 A * | 9/2015 | |
| WO | WO-2014025431 A1 * | 2/2014 | ............. G06Q 40/02 |

OTHER PUBLICATIONS

Muske, G., & Winter, M. (2001). An in-depth look at family cash-flow management practices. Journal of Family and Economic Issues, 22(4), 353-372. Retrieved from https://www.proquest.com/scholarly-journals/depth-look-at-family-cash-flow-management/docview/197978748/se-2 (Year: 2001).*

(Continued)

*Primary Examiner* — Ashford S Hayles
(74) *Attorney, Agent, or Firm* — Fletcher Yoder, P.C.

(57) ABSTRACT

In one embodiment, one or more non-transitory, computer-readable mediums store computer instructions that, when executed by a processor, cause the processor to receive a selection of at least one spend category out of a number of spend categories to track and a target spend amount for a timeframe, track one or more transactions associated with the selected at least one spend category by filtering the one or more transactions into respective bins based on merchant category codes assigned to the one or more transactions during the timeframe, and perform one or more actions based on an actual amount spent relative to the target spend amount for the timeframe.

20 Claims, 19 Drawing Sheets

(56) References Cited

U.S. PATENT DOCUMENTS

| | | | | |
|---|---|---|---|---|
| 6,792,422 B1* | 9/2004 | Stride | | G06Q 40/02 707/738 |
| 7,263,527 B1* | 8/2007 | Malcolm | | G06Q 30/02 707/999.102 |
| 7,552,087 B2* | 6/2009 | Schultz | | G07F 17/42 705/38 |
| 7,606,750 B1* | 10/2009 | Hoag | | G06Q 40/00 705/30 |
| 7,792,748 B1* | 9/2010 | Ebersole | | G06Q 20/108 345/619 |
| 7,865,435 B1* | 1/2011 | Medina, III | | G06Q 40/02 705/40 |
| 7,895,096 B1* | 2/2011 | Vu | | G06Q 20/10 705/30 |
| 7,895,102 B1* | 2/2011 | Wilks | | G06Q 40/06 434/362 |
| 8,027,891 B2* | 9/2011 | Preston | | G06Q 40/00 705/30 |
| 8,095,439 B1* | 1/2012 | Harman | | G06Q 20/0453 705/16 |
| 8,170,933 B1* | 5/2012 | Cameron | | G06Q 10/06 705/30 |
| 8,296,229 B1* | 10/2012 | Yellin | | G06Q 40/00 705/39 |
| 8,332,288 B2* | 12/2012 | Preston | | G06Q 40/02 705/30 |
| 8,335,728 B1* | 12/2012 | Dahodwala | | G06Q 40/02 705/27.1 |
| 8,380,623 B1* | 2/2013 | Ley | | G06Q 40/02 705/40 |
| 8,438,091 B1* | 5/2013 | Berman | | G06Q 40/00 705/40 |
| 8,533,082 B1* | 9/2013 | Sudjianto | | G06Q 40/03 705/35 |
| 8,706,575 B2* | 4/2014 | Mulry | | G06Q 20/4037 705/30 |
| 8,719,132 B1* | 5/2014 | Diggdon | | G06Q 20/00 705/38 |
| 9,754,318 B1* | 9/2017 | Spies | | G06Q 20/10 |
| 9,824,393 B2* | 11/2017 | Joseph | | G06Q 20/10 |
| 10,460,376 B1* | 10/2019 | Krakowiecki | | G06Q 40/00 |
| 10,692,155 B2* | 6/2020 | Clark | | G06Q 20/34 |
| 10,810,660 B1* | 10/2020 | Diggdon | | G06Q 20/00 |
| 10,977,725 B1* | 4/2021 | Flowers | | G06Q 30/0255 |
| 2001/0023402 A1* | 9/2001 | Flynn | | G06Q 30/016 705/304 |
| 2001/0032076 A1* | 10/2001 | Kursh | | H04M 15/88 704/257 |
| 2002/0010612 A1* | 1/2002 | Smith | | G06Q 50/01 705/7.35 |
| 2002/0095363 A1* | 7/2002 | Sloan | | G06Q 40/06 705/36 R |
| 2002/0174006 A1* | 11/2002 | Rugge | | G06Q 10/10 705/36 R |
| 2003/0009402 A1* | 1/2003 | Mullen | | G06Q 40/12 705/35 |
| 2004/0225567 A1* | 11/2004 | Mitchell | | G06Q 40/12 705/16 |
| 2005/0137953 A1* | 6/2005 | McDonough | | G06Q 40/12 705/36 R |
| 2006/0224475 A1* | 10/2006 | Kramer | | G06Q 40/12 705/30 |
| 2007/0005477 A1* | 1/2007 | McAtamney | | G06Q 40/00 705/35 |
| 2007/0012758 A1* | 1/2007 | Wilson | | G09B 19/18 235/379 |
| 2007/0033134 A1* | 2/2007 | Carretta | | G06Q 20/10 705/38 |
| 2007/0088641 A1* | 4/2007 | Aaron | | G06Q 40/00 705/35 |
| 2007/0174163 A1* | 7/2007 | Griffin | | G06Q 40/00 705/35 |
| 2007/0260532 A1* | 11/2007 | Blake, III | | G06Q 40/00 705/35 |
| 2008/0033876 A1* | 2/2008 | Goldman | | G06Q 20/108 705/42 |
| 2008/0046347 A1* | 2/2008 | Smith | | G06Q 40/12 705/30 |
| 2008/0147523 A1* | 6/2008 | Mulry | | G07F 7/08 705/30 |
| 2008/0195438 A1* | 8/2008 | Manfredi | | G06Q 40/02 |
| 2008/0215455 A1* | 9/2008 | Leggett | | G06Q 30/0619 705/26.64 |
| 2008/0228637 A1* | 9/2008 | Scipioni | | G06Q 40/02 705/35 |
| 2008/0245854 A1* | 10/2008 | Monden | | G06Q 40/02 235/379 |
| 2008/0301042 A1* | 12/2008 | Patzer | | G06Q 20/10 705/39 |
| 2009/0030819 A1* | 1/2009 | VanLeeuwen | | G06Q 40/02 705/30 |
| 2009/0048957 A1* | 2/2009 | Celano | | G06Q 40/06 705/35 |
| 2009/0094156 A1* | 4/2009 | Wright | | G06Q 20/04 705/40 |
| 2009/0204498 A1* | 8/2009 | Galit | | G06Q 40/00 705/14.18 |
| 2009/0204938 A1* | 8/2009 | Schindler | | G06F 8/10 715/763 |
| 2009/0228381 A1* | 9/2009 | Mik | | G06Q 20/102 705/40 |
| 2009/0271287 A1* | 10/2009 | Halpern | | G06Q 40/00 705/26.1 |
| 2009/0276368 A1* | 11/2009 | Martin | | G06Q 40/02 705/36 R |
| 2010/0057574 A1* | 3/2010 | Banerjee | | G06Q 30/02 705/14.66 |
| 2010/0063914 A1* | 3/2010 | Lozano | | G06Q 40/02 705/35 |
| 2010/0095235 A1* | 4/2010 | Bennett | | G06Q 99/00 715/781 |
| 2010/0153242 A1* | 6/2010 | Preston | | G06Q 40/12 705/30 |
| 2010/0162152 A1* | 6/2010 | Allyn | | G06F 3/04842 715/767 |
| 2010/0257066 A1* | 10/2010 | Jones | | G06Q 20/202 705/17 |
| 2010/0257094 A1* | 10/2010 | Kumar | | G06F 21/41 705/40 |
| 2010/0268629 A1* | 10/2010 | Ross | | G06Q 10/10 705/35 |
| 2010/0274830 A1* | 10/2010 | Stever | | G06F 3/0482 708/174 |
| 2010/0280935 A1* | 11/2010 | Fellowes | | G06Q 40/00 705/35 |
| 2010/0306095 A1* | 12/2010 | Olson | | G06Q 10/04 705/35 |
| 2011/0029416 A1* | 2/2011 | Greenspan | | G06Q 20/10 705/30 |
| 2011/0071886 A1* | 3/2011 | Schnur | | G06Q 10/067 705/7.29 |
| 2011/0078042 A1* | 3/2011 | Fletcher | | G06Q 20/4016 705/26.35 |
| 2011/0099063 A1* | 4/2011 | Clemmons | | G06Q 30/02 705/35 |
| 2011/0106864 A1* | 5/2011 | Neely | | G06F 15/025 708/132 |
| 2011/0107265 A1* | 5/2011 | Buchanan | | G06Q 30/02 715/835 |
| 2011/0112985 A1* | 5/2011 | Kocmond | | G06Q 40/06 705/36 R |
| 2011/0166979 A1* | 7/2011 | Zoldi | | G06Q 40/04 706/47 |
| 2011/0178908 A1* | 7/2011 | Benefield | | G06Q 40/00 705/35 |
| 2011/0184822 A1* | 7/2011 | Matkovic | | G06Q 20/209 709/227 |

(56) References Cited

U.S. PATENT DOCUMENTS

| | | | |
|---|---|---|---|
| 2011/0184851 A1* | 7/2011 | Megdal | G06Q 40/00 705/38 |
| 2011/0246355 A1* | 10/2011 | Griffin | G06Q 20/24 705/38 |
| 2011/0295731 A1* | 12/2011 | Waldron, III | G06Q 10/0635 705/35 |
| 2011/0313900 A1* | 12/2011 | Falkenborg | G06Q 20/227 705/30 |
| 2011/0320294 A1* | 12/2011 | Votaw | G06Q 40/00 705/17 |
| 2011/0320325 A1* | 12/2011 | Preston | G06Q 40/02 705/30 |
| 2012/0030109 A1* | 2/2012 | Dooley Maley | G06Q 20/2295 705/44 |
| 2012/0130869 A1* | 5/2012 | Shergill | G06Q 40/12 705/30 |
| 2012/0130870 A1* | 5/2012 | Shergill | G06Q 40/12 705/30 |
| 2012/0150736 A1* | 6/2012 | Dickerson | G06Q 20/102 705/40 |
| 2012/0191596 A1* | 7/2012 | Kremen | G06Q 40/02 705/38 |
| 2012/0221446 A1* | 8/2012 | Grigg | G06Q 30/04 705/30 |
| 2012/0233074 A1* | 9/2012 | Dangott | G06Q 40/06 705/44 |
| 2012/0239564 A1* | 9/2012 | Summerrow | G06Q 20/28 705/41 |
| 2012/0239569 A1* | 9/2012 | Solomon | G06Q 40/02 705/42 |
| 2012/0240064 A1* | 9/2012 | Ramsay | G06T 11/00 715/762 |
| 2012/0278148 A1* | 11/2012 | Clemmons | G06Q 30/0251 705/14.17 |
| 2012/0278235 A1* | 11/2012 | Kitchel | G06Q 40/02 705/44 |
| 2013/0006824 A1* | 1/2013 | Maisonneuve | G06Q 40/06 705/35 |
| 2013/0013469 A1* | 1/2013 | Krakowiecki | G06Q 40/03 705/30 |
| 2013/0030994 A1* | 1/2013 | Calman | G06Q 40/00 705/40 |
| 2013/0036047 A1* | 2/2013 | Busher | G06Q 40/10 705/41 |
| 2013/0041819 A1* | 2/2013 | Khasho | G06Q 40/02 705/42 |
| 2013/0054436 A1* | 2/2013 | Hanson | G06Q 40/02 705/35 |
| 2013/0054456 A1* | 2/2013 | Hanson | G06Q 40/02 705/42 |
| 2013/0054460 A1* | 2/2013 | Hanson | G06Q 40/02 705/44 |
| 2013/0103580 A1* | 4/2013 | Ventura | G06Q 40/12 705/40 |
| 2013/0106708 A1* | 5/2013 | Mudu | G06F 3/04886 345/173 |
| 2013/0106830 A1* | 5/2013 | de Loera | G06T 11/206 345/589 |
| 2013/0138554 A1* | 5/2013 | Nikankin | G06Q 40/02 705/38 |
| 2013/0238487 A1* | 9/2013 | Biske | G06Q 40/02 705/39 |
| 2013/0282542 A1* | 10/2013 | White | G06Q 40/00 705/35 |
| 2013/0290072 A1* | 10/2013 | Ren | G06Q 10/0637 705/7.36 |
| 2013/0325668 A1* | 12/2013 | Fischburg | G06Q 30/0635 705/26.81 |
| 2013/0346264 A1* | 12/2013 | Falkenborg | G06Q 40/02 705/30 |
| 2014/0006198 A1* | 1/2014 | Daly | G06Q 30/06 705/26.1 |
| 2014/0012691 A1* | 1/2014 | Hanson | G06Q 20/42 705/44 |
| 2014/0012722 A1* | 1/2014 | Keld | H04M 1/72403 705/35 |
| 2014/0019317 A1* | 1/2014 | Casares | G06Q 40/12 705/30 |
| 2014/0046816 A1* | 2/2014 | Avari | G06Q 40/02 705/35 |
| 2014/0074688 A1* | 3/2014 | Shvarts | G06Q 30/02 705/38 |
| 2014/0136381 A1* | 5/2014 | Joseph | G06Q 40/02 705/35 |
| 2014/0143035 A1* | 5/2014 | Reardon | G06Q 20/10 705/14.11 |
| 2014/0156448 A1* | 6/2014 | Grigg | G06Q 30/0631 705/26.7 |
| 2014/0180794 A1* | 6/2014 | Merryman | G06Q 30/02 705/14.43 |
| 2014/0244006 A1* | 8/2014 | Lee | G05B 23/0272 700/83 |
| 2014/0258022 A1* | 9/2014 | Zamer | G06Q 30/0631 705/26.7 |
| 2014/0279302 A1* | 9/2014 | Akin | G06Q 40/10 705/30 |
| 2014/0279420 A1* | 9/2014 | Okerlund | G06Q 40/00 705/39 |
| 2014/0310142 A1* | 10/2014 | Mak | G06Q 40/00 705/35 |
| 2014/0324448 A1* | 10/2014 | Lacy | G06Q 10/10 705/2 |
| 2014/0344128 A1* | 11/2014 | Nikankin | G06Q 40/00 705/35 |
| 2015/0032581 A1* | 1/2015 | Blackhurst | G06Q 40/12 705/30 |
| 2015/0032598 A1* | 1/2015 | Fleming | G06Q 40/03 705/38 |
| 2015/0039388 A1* | 2/2015 | Rajaraman | G06Q 30/0222 705/7.29 |
| 2015/0046307 A1* | 2/2015 | Calman | G06Q 20/12 705/35 |
| 2015/0073952 A1* | 3/2015 | Ventura | G06Q 40/12 705/30 |
| 2015/0081411 A1* | 3/2015 | Tucker | G06Q 30/0215 705/14.17 |
| 2015/0112821 A1* | 4/2015 | Giacometti | G07F 19/206 705/16 |
| 2015/0142650 A1* | 5/2015 | Johnston | G06Q 20/102 705/41 |
| 2015/0186863 A1* | 7/2015 | Schwalb | G06Q 20/405 705/44 |
| 2015/0187023 A1* | 7/2015 | Nair | G06Q 10/087 705/30 |
| 2015/0222723 A1* | 8/2015 | Adapalli | H04L 67/2809 705/26.41 |
| 2016/0027102 A1* | 1/2016 | Smith | G06Q 40/00 705/35 |
| 2016/0048928 A1* | 2/2016 | Davis | G06Q 40/12 705/30 |
| 2016/0071200 A1* | 3/2016 | Lee | G06Q 40/00 705/35 |
| 2016/0103886 A1* | 4/2016 | Prophete | G06F 40/205 707/722 |
| 2016/0125317 A1* | 5/2016 | Benjamin | G06Q 30/02 706/12 |
| 2016/0125408 A1* | 5/2016 | Crawford | G06Q 20/405 705/34 |
| 2016/0125524 A1* | 5/2016 | Loskamp | G06Q 40/00 705/35 |
| 2016/0155147 A1* | 6/2016 | Dunham | G06Q 30/0241 705/14.54 |
| 2016/0180465 A1* | 6/2016 | Deperro | G06Q 40/06 705/36 R |
| 2016/0210572 A1* | 7/2016 | Shaaban | G06Q 40/12 |
| 2016/0314451 A1* | 10/2016 | Martin | G06Q 20/227 |
| 2016/0314465 A1* | 10/2016 | Martin | G06Q 20/20 |
| 2016/0321705 A1* | 11/2016 | Scheidelman | G06F 40/20 |

(56) References Cited

U.S. PATENT DOCUMENTS

| | | | | |
|---|---|---|---|---|
| 2016/0335724 | A1* | 11/2016 | Mak | G06Q 40/06 |
| 2017/0076379 | A1* | 3/2017 | Wadley | G06Q 50/01 |
| 2017/0124541 | A1* | 5/2017 | Aggarwal | G06Q 20/102 |
| 2017/0195994 | A1* | 7/2017 | Cole | G06Q 20/326 |
| 2018/0101860 | A1* | 4/2018 | Fleming | G06Q 30/0239 |
| 2020/0013082 | A1* | 1/2020 | Tucker | G06Q 30/0215 |

OTHER PUBLICATIONS

Merchant Category Codes (MCC), Treasury and Trade Solutions citi.com/treasuryandtradesolutions (Year: 2015).*

* cited by examiner

SYSTEMS AND METHODS FOR MANAGING AND REDUCING SPENDING

CROSS-REFERENCE TO RELATED APPLICATION

This application claims priority to and the benefit of U.S. Provisional Application No. 62/368,098 entitled "SPENDING SPOTTER," filed Jul. 28, 2016, which is hereby incorporated by reference in its entirety for all purposes.

BACKGROUND

The present disclosure relates generally to spend management software applications, and more specifically, to systems and methods for managing and reducing spending using spend management software applications.

Budgeting refers to a quantitative expression of a plan for a period of time. People may set budgets for expenses to save money and build a savings account, investment account, or the like. For example, people may budget a certain amount of money out of a paycheck that they want to spend in a month after they pay their recurring bills (e.g., utilities, mortgage, rent, car payment, etc.) and/or put money in savings. However, as time passes during the month, people may lose track of the amount of money they have spent or how close they are to spending the budgeted amount of money. As a result, people may spend more than desired for the month. Also, budgeting at such a holistic level may be difficult to accomplish for some people.

BRIEF DESCRIPTION

In one embodiment, one or more non-transitory, computer-readable mediums store computer instructions that, when executed by a processor, cause the processor to receive a selection of at least one spend category out of a number of spend categories to track and a target spend amount for a timeframe, track one or more transactions associated with the selected at least one spend category by filtering the one or more transactions into respective bins based on merchant category codes assigned to the one or more transactions during the timeframe, and perform one or more actions based on an actual amount spent relative to the target spend amount for the timeframe.

In one embodiment, a computer-implemented method includes receiving inputs related to a selection of at least one spend category out of a number of spend categories to track and a target spend amount for the at least one spend category for a timeframe, tracking one or more transactions associated with the selected at least one spend category by filtering the one or more transactions into respective bins based on merchant category codes assigned to the one or more transactions during the timeframe, and performing one or more actions based on progress made toward the target spend amount during the timeframe. The one or more actions include displaying an alert that includes an actual amount spent relative to the target spend amount for the timeframe.

In one embodiment, a system includes a financial institution server configured to provide transaction data associated with one or more accounts and a computing device communicatively coupled to the financial institution server. The computing device including one or more processors that receives the transaction data from the financial institution server, receives a selection of at least one spend category out of a number of spend categories to track and a target spend amount for a timeframe, and tracks one or more transactions that are associated with the selected at least one spend category using the transaction data. The transaction data is filtered into respective bins associated with each of the number of spend categories based on merchant category codes of the transaction data. The one or more processors also performs one or more actions based on an actual amount spent relative to the target spend amount for the timeframe.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally related to a spend management application that enables monitoring budgets for designated time periods and providing feedback during the time period to help keep users on track, as well as performing other actions. In some embodiments, the spend management application may receive a target spend amount for a selected spend category (e.g., restaurants, retail, entertainment, etc.) over a timeframe and perform an action based on progress made toward the target spend amount. For example, the action may include providing alerts indicative of the amount of progress made toward the target spend amount in the selected timeframe. In this way, the user may curb their spending in the spend category if they are approaching the target spend amount for the selected timeframe. Additional or alternative actions may include displaying congratulatory messages when the user spends less than the target spend amount, transferring the difference (e.g., money) between the target spend amount and the actual amount spent from one account (e.g., checking) to another (e.g., savings) at the end of the timeframe, or the like. In some embodiments, the spend management application may track historical spend data and provide recommended target spend amounts based on the historical spend data for particular spend categories. It should be noted that the spend management application enables granular spend management and reduction at the spend category level, as opposed to holistically tracking all spend categories at the same time, which may be overwhelming to users. That is, some embodiments may enable users to focus managing and reducing expenses one spend category at a time. Although, in some embodiments, multiple spend categories may be tracked.

Figure 1:
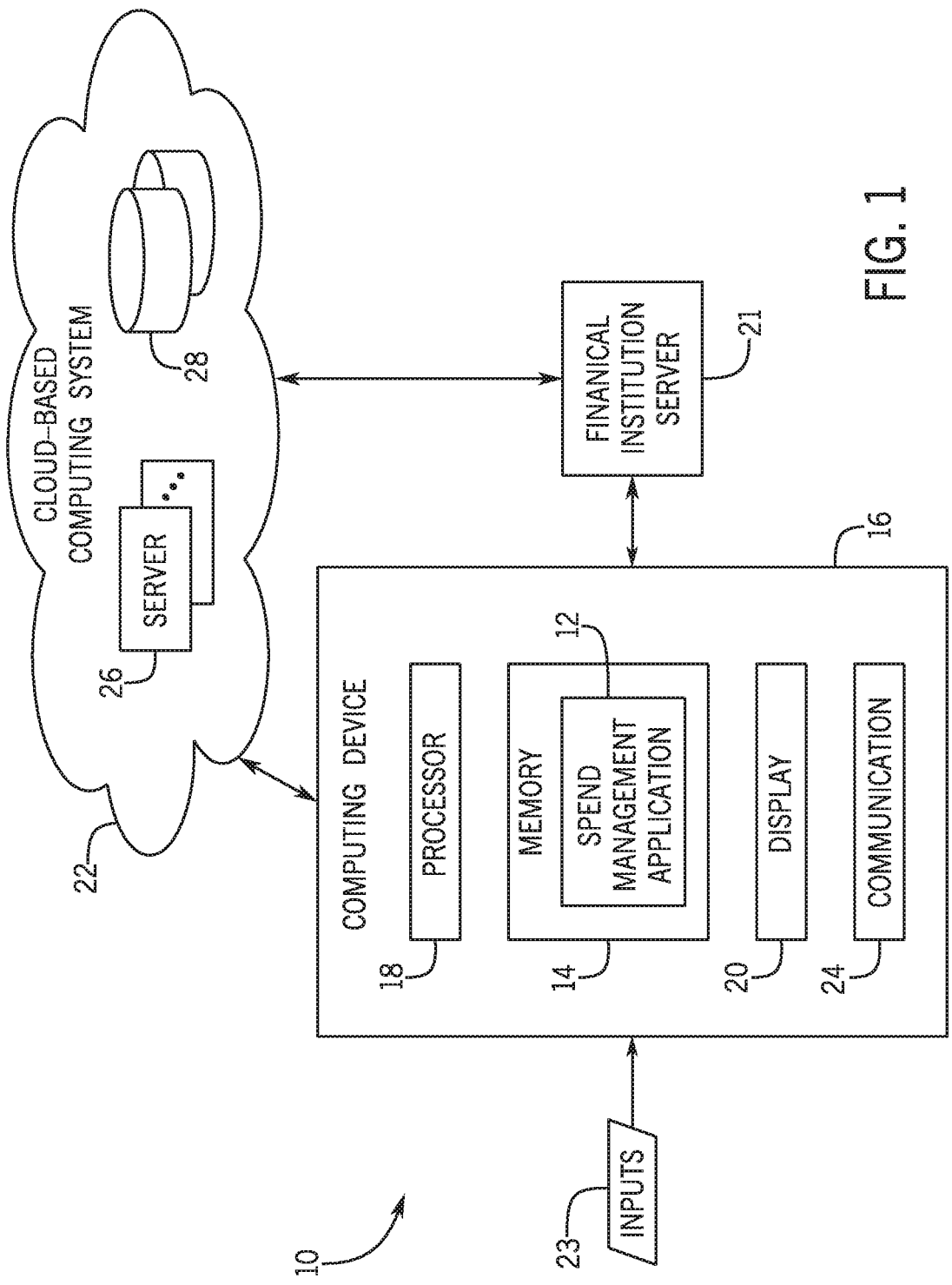
FIG. 1 is a block diagram of an embodiment of a system that may be utilized to manage and reduce spending using a spend management application, in accordance with an aspect of the present disclosure.

Turning now to the figures, FIG. 1 is a block diagram of an embodiment of a system 10 that may be utilized to manage and reduce spending using a spend management application 12. The spend management application 12 may be implemented as instructions stored on one or more memories 14 of a computing device 16. The instructions may be executed by one or more processors 18 of the computing device 16 to cause the one or more processors 18 to perform various functions described below. The computing device 16 may be a general purpose computing device, such as a laptop computer, a personal computer, a tablet, a mobile device, or a smart phone. The spend management application 12 may be downloaded from a software distribution platform or website via a public network (e.g., Internet) or a private network (e.g., local area network), installed via a storage device (e.g., compact disk, jumpdrive, etc.), or the like.

The spend management application 12 may include instructions that, when executed by the processor, cause a graphical user interface (GUI) to be displayed on a display 20 of the computing device 16. In some embodiments, the spend management application 12 may include instructions that cause the processor to communicate with a financial institution server 21 to retrieve, edit, add, or delete certain transaction data associated with an account of the user. For example, the spend management application 12 may receive various inputs 23 related to an account, a spend category, a target spend amount, a timeframe, and the like, and may manage and reduce spending by tracking transactions, account balances, and the like received from the financial institution server 21. Further, the spend management application 12 may be wholly implemented on the computing device 16, wholly implemented in a cloud-based computing system 22, or partially implemented on both the computing device 16 and the cloud-based computing system 22. Accordingly, the computing device 16 may include communication circuitry 24 (e.g., wireless or wired) that enables communication with the cloud-based computing system 22 and/or the financial institution server 21.

The processor 18 may be any type of computer processor or microprocessor capable of executing computer-executable code. The processor 18 may also include multiple processors that may perform the operations described below. The memory 14 may be any suitable articles of manufacture that can serve as media to store processor-executable code, data (e.g., previous target spend amounts, historical spending, etc.), or the like. These articles of manufacture may represent non-transitory, computer-readable media (e.g., any suitable form of memory or storage) that may store the processor-executable code used by the processor 18 to perform the presently disclosed techniques. It should be noted that non-transitory merely indicates that the media is tangible and not a signal. Generally, the processor 18 may execute the spend management application 12 that enables a user to manage and reduce spending.

The display 20 may depict various pages, notifications, alerts, and the like of a graphical user interface (GUI) of the spend management application 12, as well as other GUIs associated with other programs (e.g., operating system, software applications, etc.) installed on the computing device 16. In some embodiments, the display 20 may be a touch display capable of receiving inputs from a user of the computing device 16. The display 20 may be used to display the GUI for operating the spend management application 12. The display 20 may be any suitable type of display, such as a liquid crystal display (LCD), plasma display, or an organic light emitting diode (OLED) display, for example.

The cloud-based computing system 22 may include a number of computing devices, such as servers 26 that may be communicatively coupled to each other and may distribute various tasks between each other to perform the tasks more efficiently. In certain embodiments, each server 26 may include the example components described above as part of the computing device 16. The servers 26 may also be communicatively coupled to the computing device 16 and/or the financial institution server 21. In some embodiments, the cloud-based computing system 22 may provide shared resources that enable distributed computing to enhance performance of various functionalities of the system 10 provided herein. The cloud-based computing system 22 may also include one or more databases 28 to store data 28.

The servers 26 may include one or more processors capable of executing processor-executable instructions. In some embodiments the cloud-based computing system 22 may use a network of the servers 26 hosted remotely from the computing device 16 to store, manage, and/or process data, rather than solely on the computing device 16. In some embodiments, the servers 26 may include dedicated financial institution servers that securely access the financial accounts of the user, or the servers 26 may be in communication with the financial institution server 21 that accesses the financial accounts of the user. It should be noted that the financial institution server 21 may include similar components as those described for the computing device 26. It should also be noted that the listed components are provided as example components and the embodiments described herein are not to be limited to the components described with reference to FIG. 1. It should be understood that, in the embodiments disclosed herein, the system 10 enables managing and reducing spending via the spend management application 12.

Figure 2:
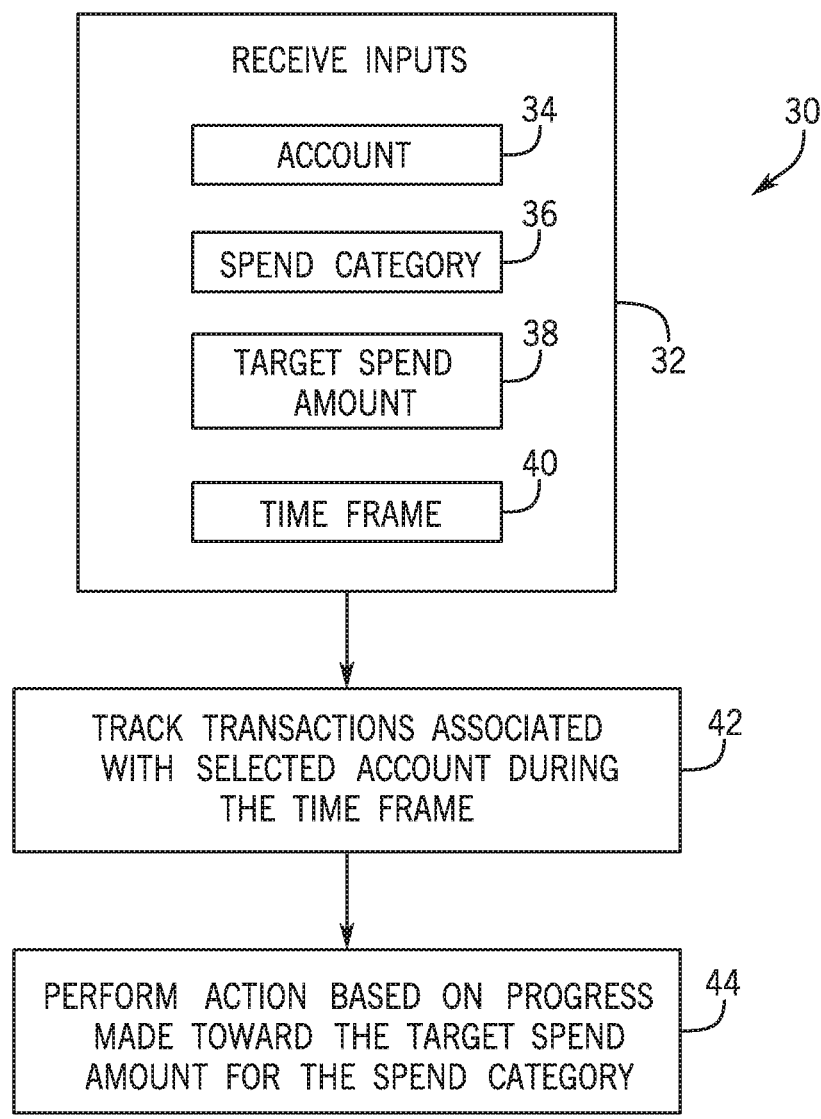
FIG. 2 is a process flow diagram illustrating an embodiment of a process of managing and reducing spending using the spend management application, in accordance with an aspect of the present disclosure.

FIG. 2 is a process flow diagram illustrating an embodiment of a process 30 of managing and reducing spending using the spend management application 12, in accordance with an aspect of the present disclosure. Although the following description of the process 30 is described with reference to the processor 18 of the computing device 16, it should be noted that the process 30 may be performed by one or more other processors disposed on other devices that may be capable of communicating with the computing device 16, such as the cloud-based computing system 22, the financial institution server 21, or other components associated with the system 10. Additionally, although the following process 30 describes a number of operations that may be performed, it should be noted that the process 30 may be performed in a variety of suitable orders and all of the operations may not be performed. It should be appreciated that the process 30 may be wholly executed by the computing device 16 or the execution may be distributed between the computing device 16, the cloud-based computing system 22, and/or the financial institution server 21. The process 30 may be implemented as instructions included as part of the spend management application 12.

Referring now to the process 30, the processor 18 may receive (block 32) the inputs 23. The inputs 23 may be received as selections from the user using one or more input peripherals, such as a mouse, keyboard, or the like. In some embodiments, the inputs 23 may be received as selections from the user using a touch-screen of the display 20. The inputs 23 may include a financial institution account (block 34), such as a checking account, savings account, credit card account, or the like. The inputs 23 may also include a spend category (block 36) to monitor. The spend categories may include entertainment (e.g., movie theaters, bowling alleys, golf clubs, etc.), restaurants (e.g., restaurants, coffee shops, pubs), retail (e.g., clothing stores, department stores, home improvement stores, etc.), travel (e.g., airports, bus stations, train stations, ports, etc.), or the like. In some embodiments, only one spend category may be selected for monitoring. In this way, the spend management application 12 may be more user friendly by focusing on one spend category to manage and not as overwhelming as monitoring every category at once. In some embodiments, more than one spend category may be selected. Additional inputs may include a target spend amount (block 38) and/or a timeframe (block 40) (e.g., day, week, month, year, etc.) to monitor.

The processor 18 may track (block 42) transactions made associated with the selected account during the selected timeframe. In some embodiments, as described in more detail below, the processor 18 may track a merchant category code that is associated with each transaction made using a financial institution card (e.g., debit card) and use the merchant category code for spend management and reduction purposes. A merchant category code may be defined as a number (e.g., four-digit number) associated with a business by credit card companies. The merchant category code is an established code that classifies the merchant based on the type of services or goods the merchant primarily provides. The processor 18 may also perform (block 44) one or more actions based on progress made toward the target spend amount for the spend category during the timeframe.

For example, the user may have entered a target spend amount of $150 over a month timeframe for the entertainment spend category. The processor 18 executing the spend management application 12 may provide alerts via a graphical user interface of the spend management application 12 on the display 20 of the computing device 16. The alerts may indicate the progress that has been made toward the target spend amount for the designated month timeframe. For example, an alert may indicate that 5 percent, 25 percent, 50 percent, 75 percent, or 100 percent of the budget for the designated timeframe has been spent. Further, the alerts may indicate how much money is left of the target spend amount to be spent for the designated timeframe before the target spend amount is reached. The alerts may be sent over a configurable period (e.g., every day, week, month). As a result, the user may reduce spending in the designated spend category if they are approaching the target spend amount for the designated timeframe.

Another action may include generating and displaying certain congratulatory messages when the user spends less than the target spend amount for the designated timeframe. For example, the processor 18 may generate a congratulations message if the user spend $100 and the target spend amount was $150 for the month. In some embodiments, encouraging messages may also be generated and displayed based on the progress toward the target spend amount. For example, the processor 18 may generate a message that says, "Only one week left in the designated timeframe, spend less than $50 and you will achieve your goal!" In some embodiments, the processor 18 may display messaging on the display 20 that suggests the user reduces the targeted spend amount when the user spends less than the current target spend amount. For example, a message may be displayed that says, "You spent $50 less than your target spend amount, try lowering your target spend amount by $50 for the next timeframe."

Another action may include transferring funds between accounts of the financial institution when the user spends less than the target spend amount. That is, the processor 18 executing the spend management application 12 may transfer the difference between what the user actually spent and the target spend amount for the designated timeframe to a designated account (e.g., savings) of the user. In this way, the disclosed embodiments may aid the user in building savings or investments. In such embodiments, the processor 18 may communicate with the financial institution server 21 and/or the cloud-based computing system 22 to ensure that there is enough money in the monitored account to move money out of the monitored account without causing the account to be overdrawn.

Figure 3:
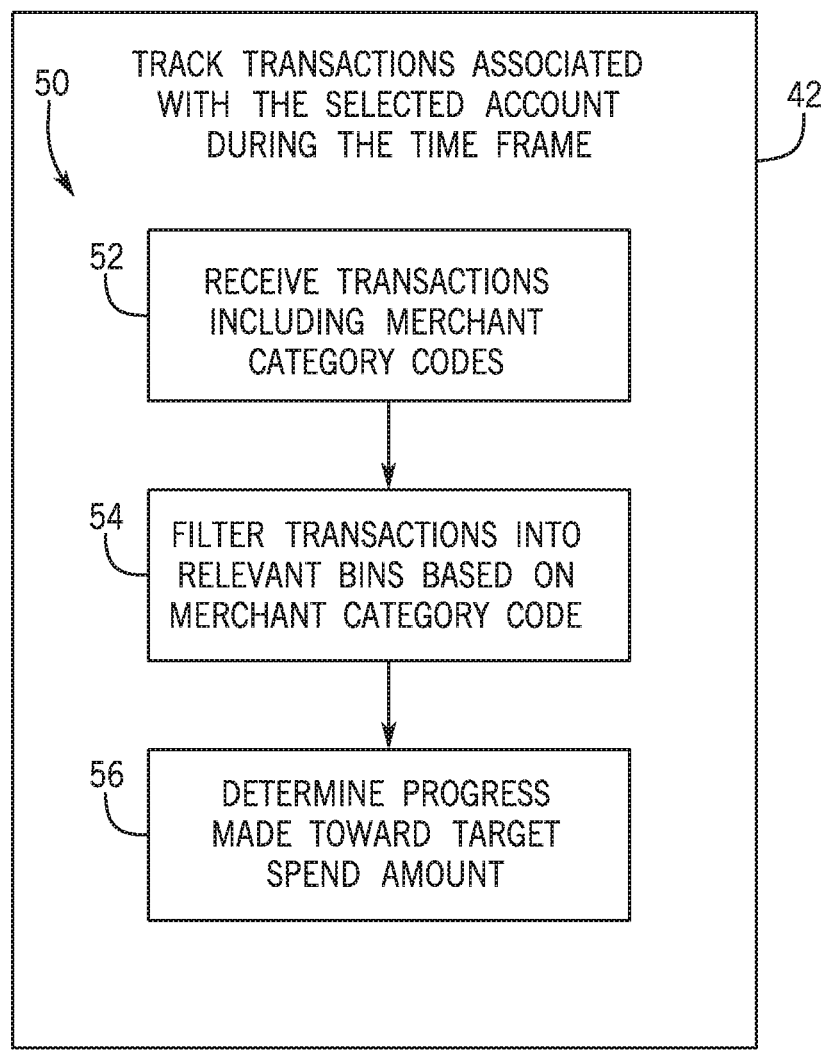
FIG. 3 is a process flow diagram illustrating an embodiment of a process of tracking transactions associated with a selected account during a selected time period, in accordance with an aspect of the present disclosure.

Returning to how the processor 18 tracks transactions, FIG. 3 is a process flow diagram illustrating an embodiment of a process 50 of tracking transactions associated with the selected account during the selected timeframe, in accordance with an aspect of the present disclosure. The process 50 may be included as part of block 42 of the process 30 depicted in FIG. 2. Although the following description of the process 50 is described with reference to the processor 18 of the computing device 16, it should be noted that the process 50 may be performed by one or more other processors disposed on other devices that may be capable of communicating with the computing device 16, such as the cloud-based computing system 22, the financial institution server 21, or other components associated with the system 10. Additionally, although the following process 50 describes a number of operations that may be performed, it should be noted that the process 50 may be performed in a variety of suitable orders and all of the operations may not be performed. It should be appreciated that the process 50 may be wholly executed by the computing device 16 or the execution may be distributed between the computing device 16, the cloud-based computing system 22, and/or the financial institution server 21. The process 50 may be implemented as instructions included as part of the spend management application 12.

Referring now to the process 50, the processor 18 may receive (block 52) transactions including merchant category codes. The transactions may be received via the financial institution server 21 and/or the cloud-based computing system 22. As may be appreciated, at the time of a transaction, a merchant assigns a merchant category code to the transaction that indicates the type of business or service the merchant provides (e.g., restaurant, entertainment, retail, etc.). For example, a fast food restaurant associates a merchant category code with a transaction that identifies the transaction as being related to restaurants. A movie theater may associate a merchant category code with the transaction that identifies the transaction as being related to entertainment. The processor 18 may filter (block 54) transactions into relevant bins based on the merchant category codes.

Based on the spend category selected by the user, the processor 18 may determine (block 56) progress (e.g., actual amount of money spent) toward the target spend amount by retrieving and summing transactions in the bin related to the spend category. That is, the processor 18 may sum all transactions made during the timeframe and compare the summed amount of money spent to the target spend amount to determine progress made toward the target spend amount. Using the merchant category code to key off of may provide a relatively more efficient system for monitoring transactions at financial institutions and tracking budgets associated with accounts at the financial institutions. For example, because the merchant already associated a merchant category code when the transaction is made, the processor 18 executing the spend management application 12 can avoid contacting a separate categorization system to determine the category with which each transaction is associated.

Figure 4:
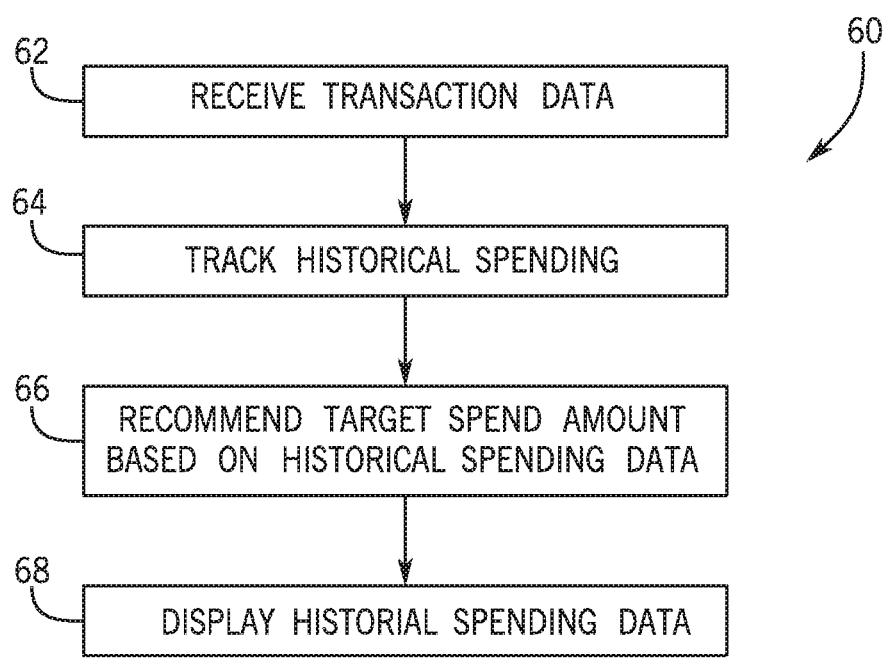
FIG. 4 is a process flow diagram illustrating an embodiment of a process of tracking historical spending data to recommend target spend amounts, in accordance with an aspect of the present disclosure.

Further, in some embodiments, based on the user's historical spending habits, the processor 18 may recommend a target spend amount, among other things. For example, FIG. 4 is a process flow diagram illustrating an embodiment of a process 60 of tracking historical spending data to recommend target spend amounts, in accordance with an aspect of the present disclosure. Although the following description of the process 60 is described with reference to the processor 18 of the computing device 16, it should be noted that the process 60 may be performed by one or more other processors disposed on other devices that may be capable of communicating with the computing device 16, such as the cloud-based computing system 22, the financial institution server 21, or other components associated with the system 10. Additionally, although the following process 60 describes a number of operations that may be performed, it should be noted that the process 60 may be performed in a variety of suitable orders and all of the operations may not be performed. It should be appreciated that the process 60 may be wholly executed by the computing device 16 or the execution may be distributed between the computing device 16, the cloud-based computing system 22, and/or the financial institution server 21. The process 60 may be implemented as instructions included as part of the spend management application 12.

Referring now to the process 60, the processor 18 may receive (block 62) transaction data (e.g., from the financial institution server 21 and/or the cloud-based computing system 22). The transaction data may include the amount of money spent for each spend category during historical timeframes. Thus, the processor 18 may track (block 64) the historical spending of the user based on the transaction data to determine when certain patterns emerge, such as continuously spending less than a target spend amount. The processor 18 may recommend (block 66) a new target spend amount based on the historical spending transaction data. For example, when the processor 18 determines that the user has spent $50 less than the target spend amount for a certain number of timeframes (e.g., 1, 2, 3, 4, 5, 6), then the processor 18 may recommend reducing the target spend amount by $50.

In some embodiments, the processor 18 may display (block 68) the historical spending data. That is, the processor 18 may display the amounts of money spent for each selected spend category to enable the user to select a spend category where reduced spending may be desirable (e.g., more than a threshold of an actual amount was spent). Further, the historical amounts for each spend category may include hyperlinks that enable drilling down to display the location (e.g., store, restaurant, etc.) at which each transaction was made. That is, when the user selects to see the exact transactions that were made in the selected spend category for a designated timeframe, a list of the transactions by merchant may be displayed. In some embodiments, the user may select transactions from the list if the user determines that the merchant is incorrectly labeled in the selected merchant category bin. The user may delete the transaction from the list if the transaction does not belong in the selected merchant category bin. Also, in some embodiments, transactions may be pulled into the merchant category bin if the transactions were incorrectly excluded from the merchant category bin.

Upon selection of a spend category to track from the list of historical spending, a display box may appear that enables the user to enter the target spend amount. In some embodiments, the processor 18 may automatically fill the target spend amount with a number that is a certain percentage (e.g., 5 percent, 10 percent, 15 percent) less than the amount spent in the last timeframe. The user may keep the recommended target spend amount or may change the target spend amount as desired. Once entered, the target spend amount may be saved and the processor 18 may begin monitoring the spend category against the target spend amount for a selected timeframe.

In addition, the processor 18 may retain the target spend amounts and display a report on the display 20 that shows the target spend amounts by timeframe (e.g., day, week, month, etc.) and the actual amount of money spent during each timeframe. For example, in December the user's target spend amount may have been $50 for retail but the user spent $60, in January the user's target spend amount may have been $100 and the user spent $50, and so forth. This may enable the user to easily visualize their spending habits for the spend categories.

To illustrate some examples of the various processes 30, 50, and/or 60, as well as how the spend management application 12 may function generally, FIGS. 5-19 provide example screenshots of various pages, messages, alerts, notifications, and the like generated and displayed by the spend management application 12. It should be understood that the screenshots are for purposes of example only and not meant to limit the scope of the disclosure. For example, the layout of various graphical elements on the graphical user interfaces (GUIs) displayed by the spend management application 12 may be modified in any suitable manner as long as the underlying functionality is still provided by the spend management application 12.

Figure 5:
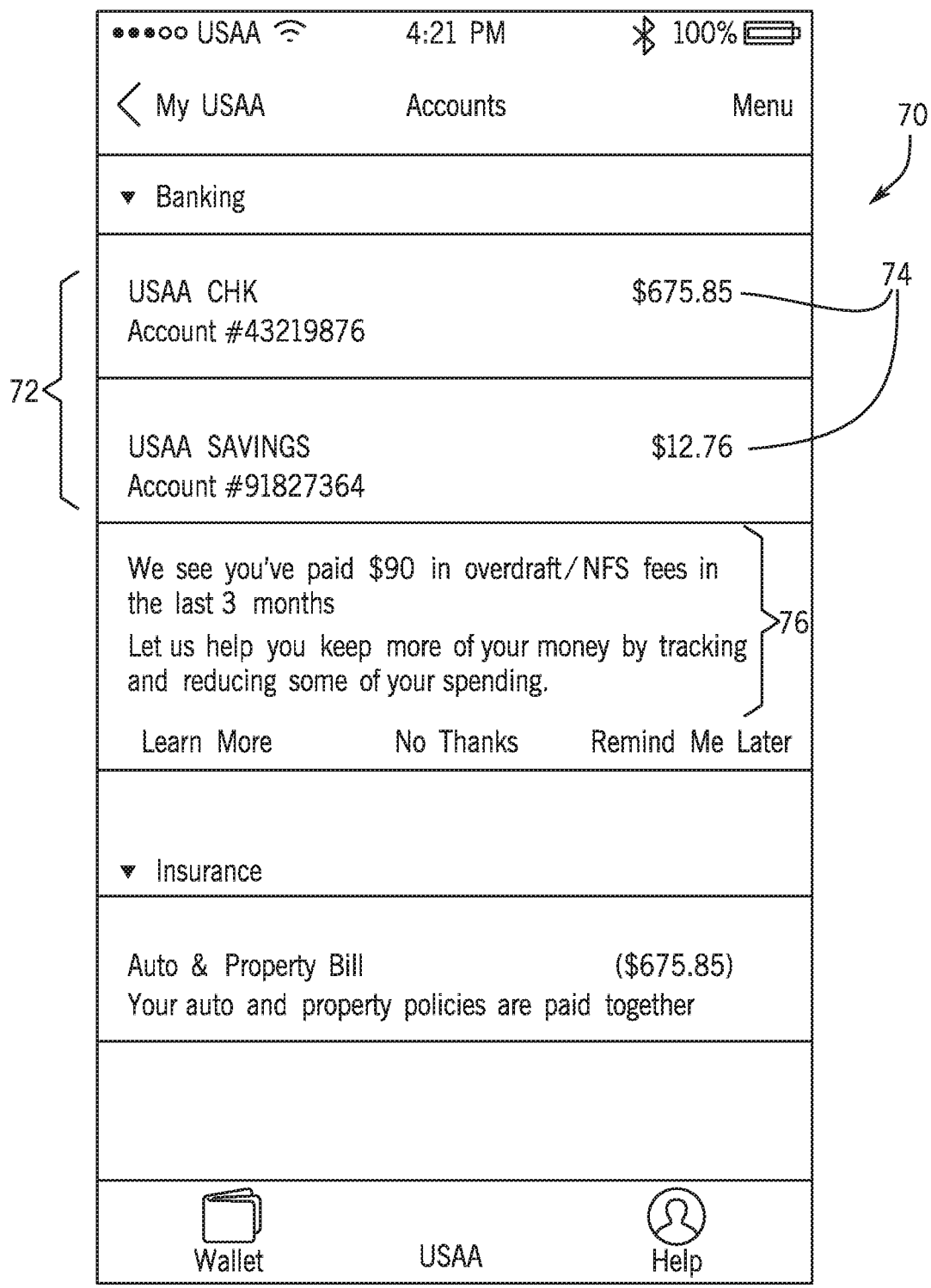
FIG. 5 is a screenshot of an account summary page of the spend management application, in accordance with an aspect of the present disclosure.

Beginning with FIG. 5, a screenshot of an account summary page 70 of the spend management application 12 is depicted, in accordance with an aspect of the present disclosure. The information depicted, including the various accounts 72 (e.g., checking and savings) and the balances 74 displayed, may be received by the spend management application 12 from the financial institution server 21 and/or the cloud-based computing system 22. As depicted, in some embodiments, a notification 76 may be displayed that requests the user's permission to enable managing and reducing expenses via the spend management application 12. The notification says, "We see you've paid $90 in overdraft/NFS fees in the last 3 months. Let us help you keep more of your money by tracking and reducing some of your spending." The user may select "Learn More," "No Thanks," or "Remind Me Later."

Figure 6:
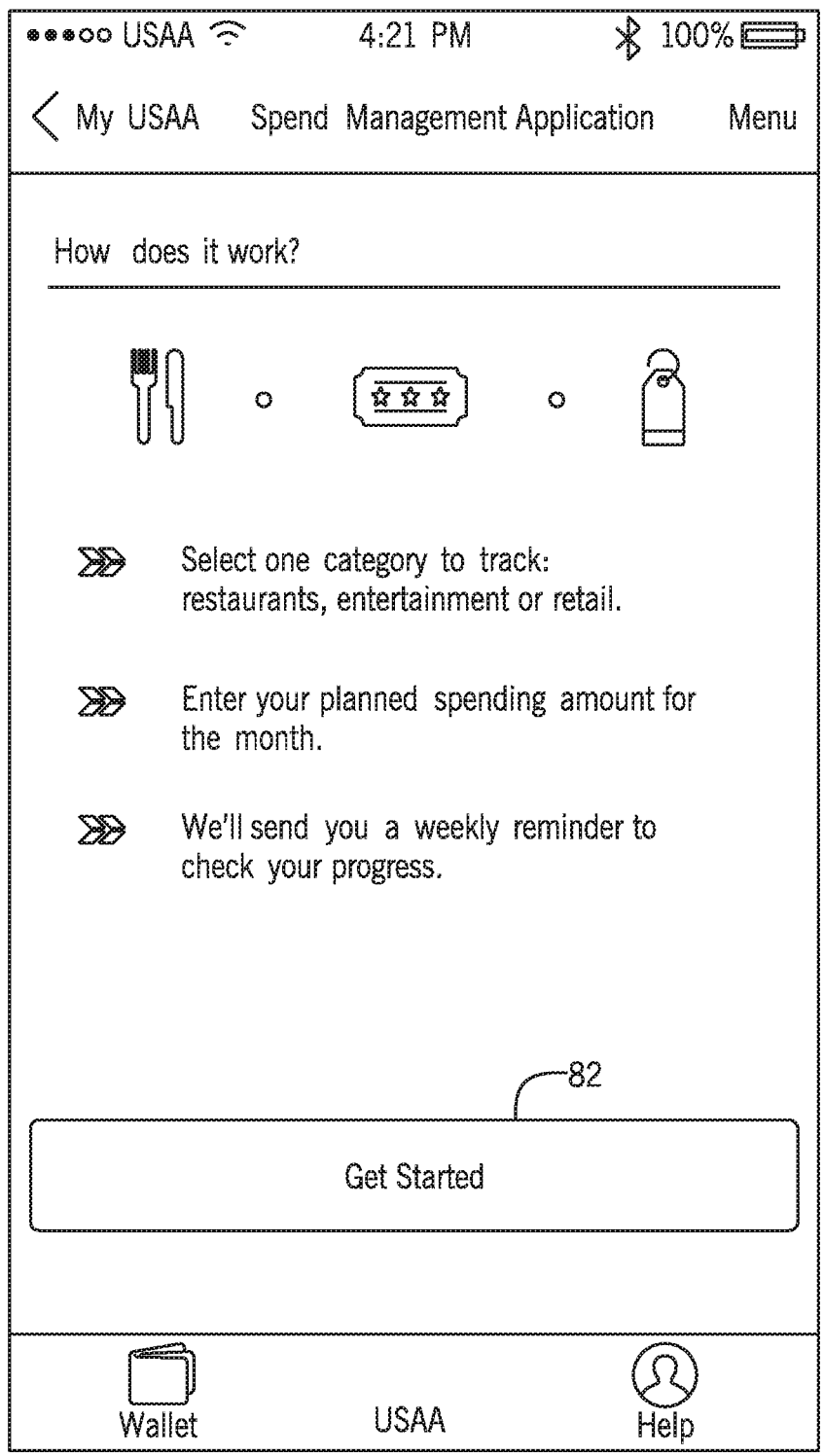
FIG. 6 is a screenshot of a process overview page of the spend management application, in accordance with an aspect of the present disclosure.

When the user selects "Learn More," an overview page 80 of the spend management application 12 may be displayed, as depicted by the screenshot in FIG. 6. The overview page 80 explains how the spend management application 12 works. For example, the overview page 80 instructs the user to "Select one category to track: restaurants, entertainment, or retail." It should be noted that other spend categories may be selectable, such as travel. The overview page 80 also instructs the user to "Enter your planned spending amount for the month." It should be noted that the timeframe may be adjustable and is not restricted to a month. Additionally, the overview page 80 states that "We'll send you a weekly reminder to check your progress." It should be noted, that in the settings of the spend management application 12, the user may configure the reminders to occur more frequently or farther apart. The overview page 80 may also include a "Get Started" button 82 that initiates the process 30 of managing and reducing spending using the spend management application 12 when selected.

Figure 7:
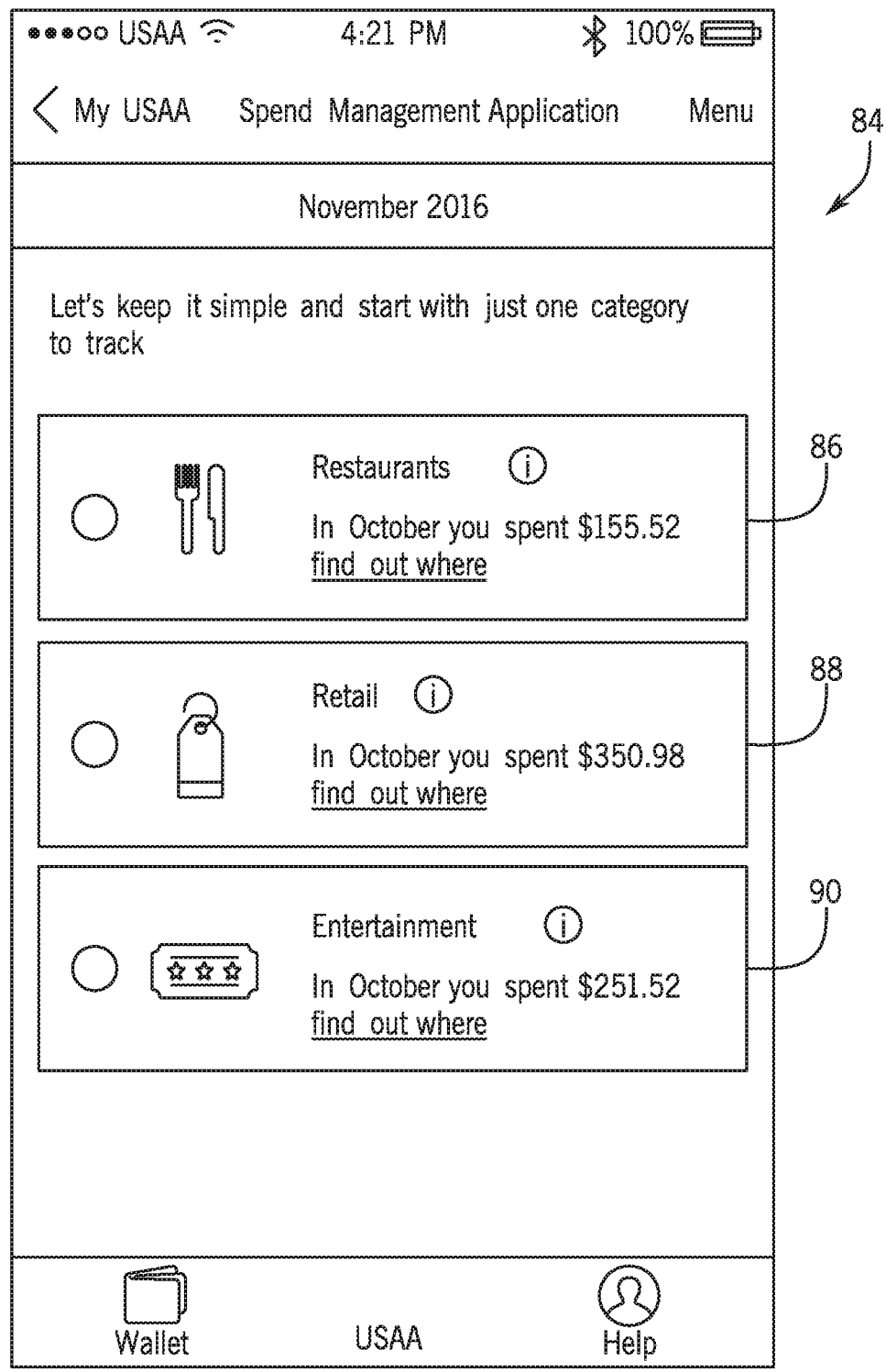
FIG. 7 is a screenshot of a spend category selection page of the spend management application, in accordance with an aspect of the present disclosure.

For example, as illustrated in FIG. 7, the spend management application 12 may display a spend category selection page 84 of the spend management application 12 when the user selects the "Get Started" button 82, in accordance with an aspect of the present disclosure. The spend category selection page 84 may display the various spend categories (e.g., restaurants 86, retail 88, and entertainment 90) from which to choose. In addition, the spend category selection page 84 may include an amount of money spent for each spend category during a particular timeframe (e.g., yesterday, last week, last month, etc.). For example, for restaurants 86, the spend category selection page 84 displays "in October you spent $155.52" with a hyperlink that says "find out where." If the user selects the hyperlink, the spend management application 12 may display a page that provides a list of all of the transactions with merchant category codes for restaurants during that timeframe. It should be noted that the spend management application 12 enables simply tracking one category at a time, as opposed to all categories at once. Additionally or alternatively, multiple spend categories may be tracked.

Figure 8:
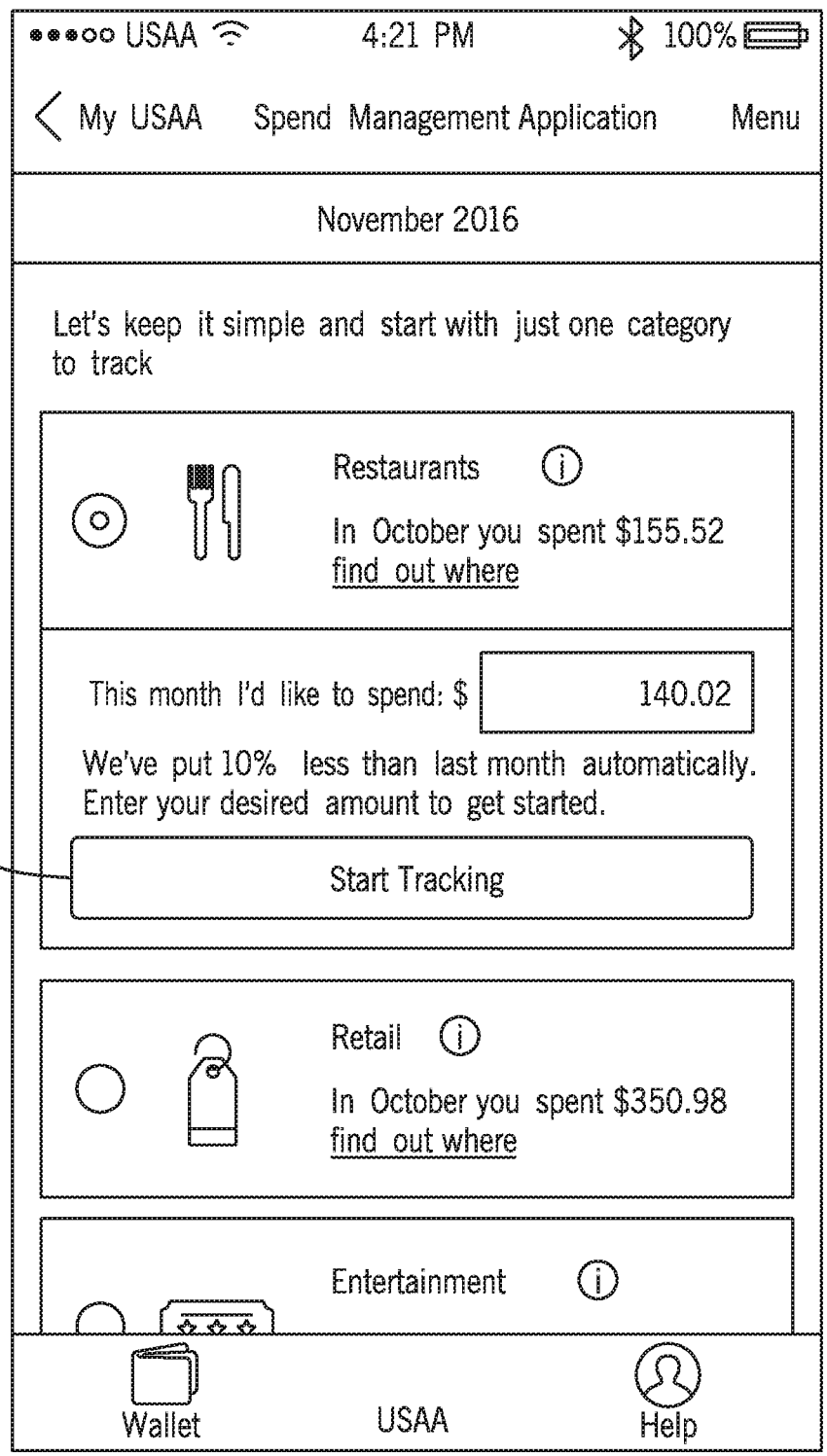
FIG. 8 is a screenshot of a target spend amount selection page of the spend management application, in accordance with an aspect of the present disclosure.
Figure 9:
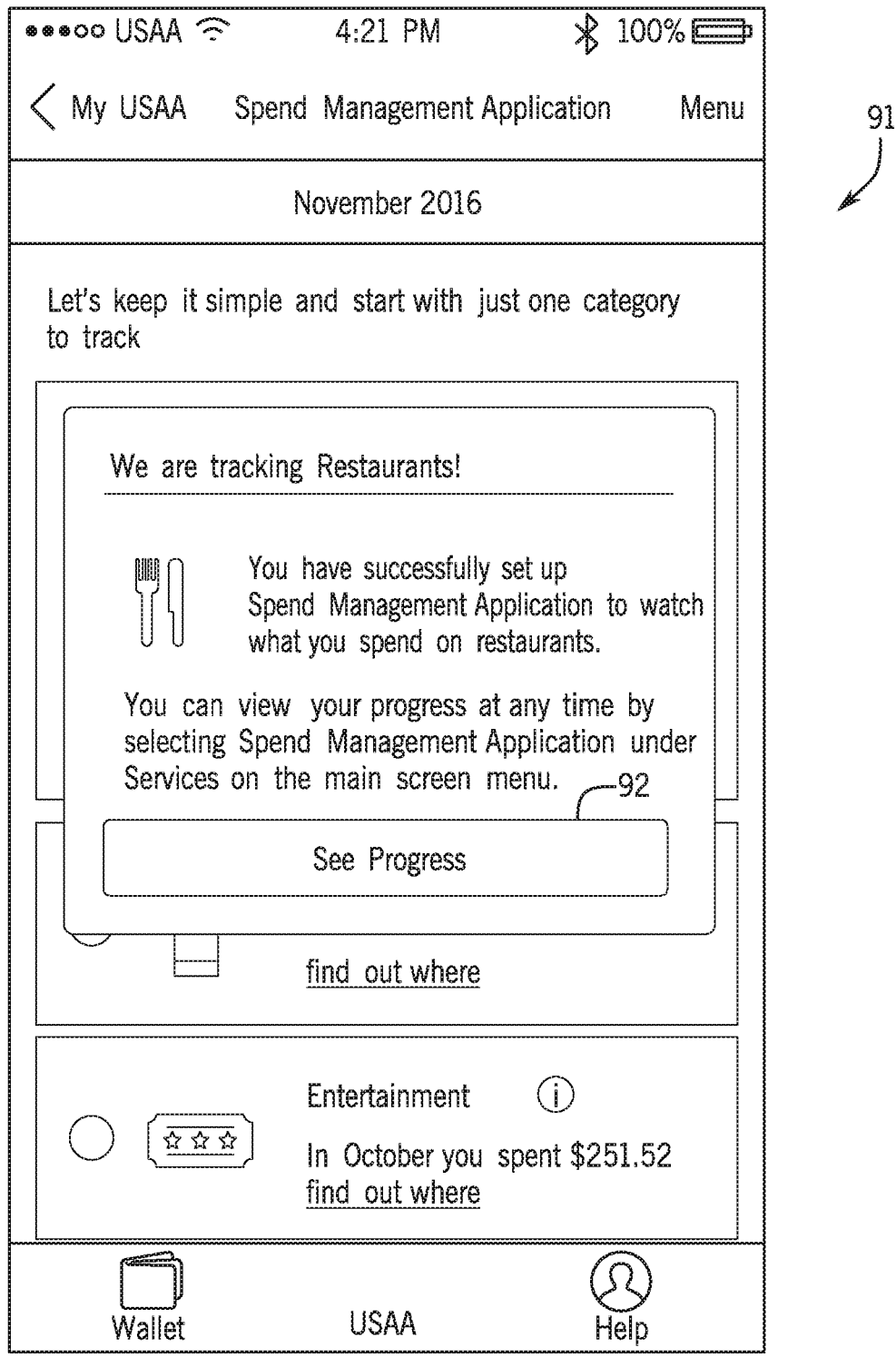
FIG. 9 is a screenshot of a setup confirmation page of the spend management application, in accordance with an aspect of the present disclosure.

Assuming the user clicks on restaurants 86, the spend management application 12 may display a target spend amount selection page 87, as depicted by the screenshot in FIG. 8 in accordance with an aspect of the present disclosure. The timeframe that is being configured is for the month of November in the depicted example. However, it should be noted that a more granular timeframe may be selected, such as daily, weekly, bi-weekly, etc. or a broader timeframe may be selected, such as yearly. The target spend amount selection page 87 may display the historical spending for the selected restaurant spend category (e.g., "in October you spent $155.52") and may recommend a target spend amount, as discussed above. In the depicted example, the spend management application 12 recommended 10% less than last month automatically. The user may either select to keep the recommended amount or may enter a new amount to track. Once the user determines the desired target spend amount, the user may click a "Start Tracking" button 89.

As a result of clicking the "Start Tracking" button 89, a setup confirmation page 91 of the spend management application 12 may be displayed, as shown in the screenshot of FIG. 8 in accordance with an aspect of the present disclosure. The setup confirmation page 91 indicates that the spend management application 12 has been configured to track the restaurant spend category (e.g., transactions with merchant category codes indicative of restaurants) and informs the user that the user may view their progress at any time by selecting the spend management application 12. Further, the setup confirmation page 91 may include a "See Progress" button 92 that displays how much money the user has spent in the timeframe compared to the target spend amount.

Figure 10:
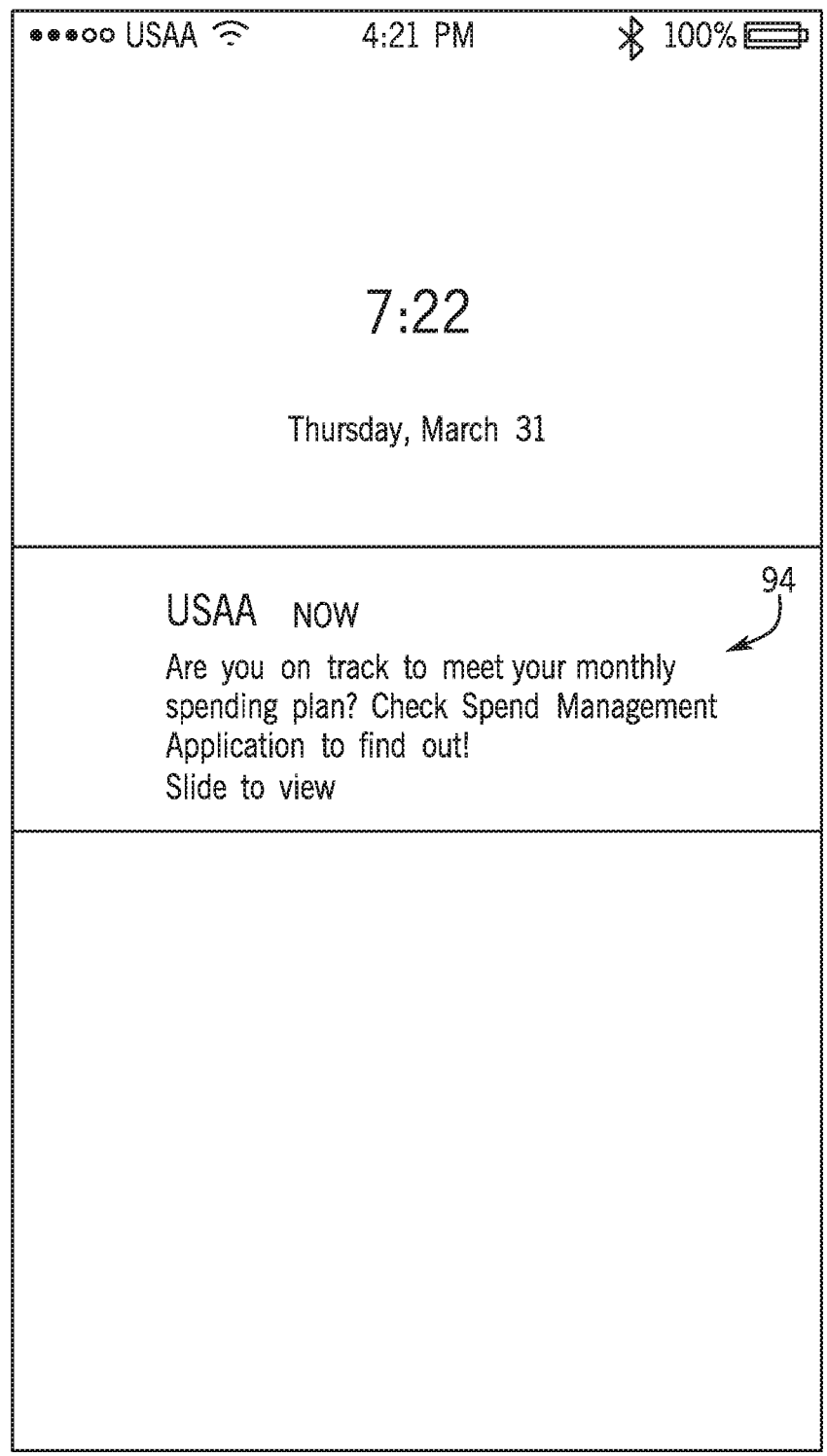
FIG. 10 is a screenshot of a push notification from the spend management application, in accordance with an aspect of the present disclosure.

In some embodiments, the spend management application 12 may provide push notifications that display on a graphical user interface of other programs (e.g., operating system) executing on the computing device 16. For example, FIG. 10 is a screenshot of a push notification 94 from the spend management application 12, in accordance with an aspect of the present disclosure. The push notification 94 prompts the user to check their progress to determine whether they are on track to spend less than the target spend amount for the designated timeframe (e.g., month).

Figure 11:
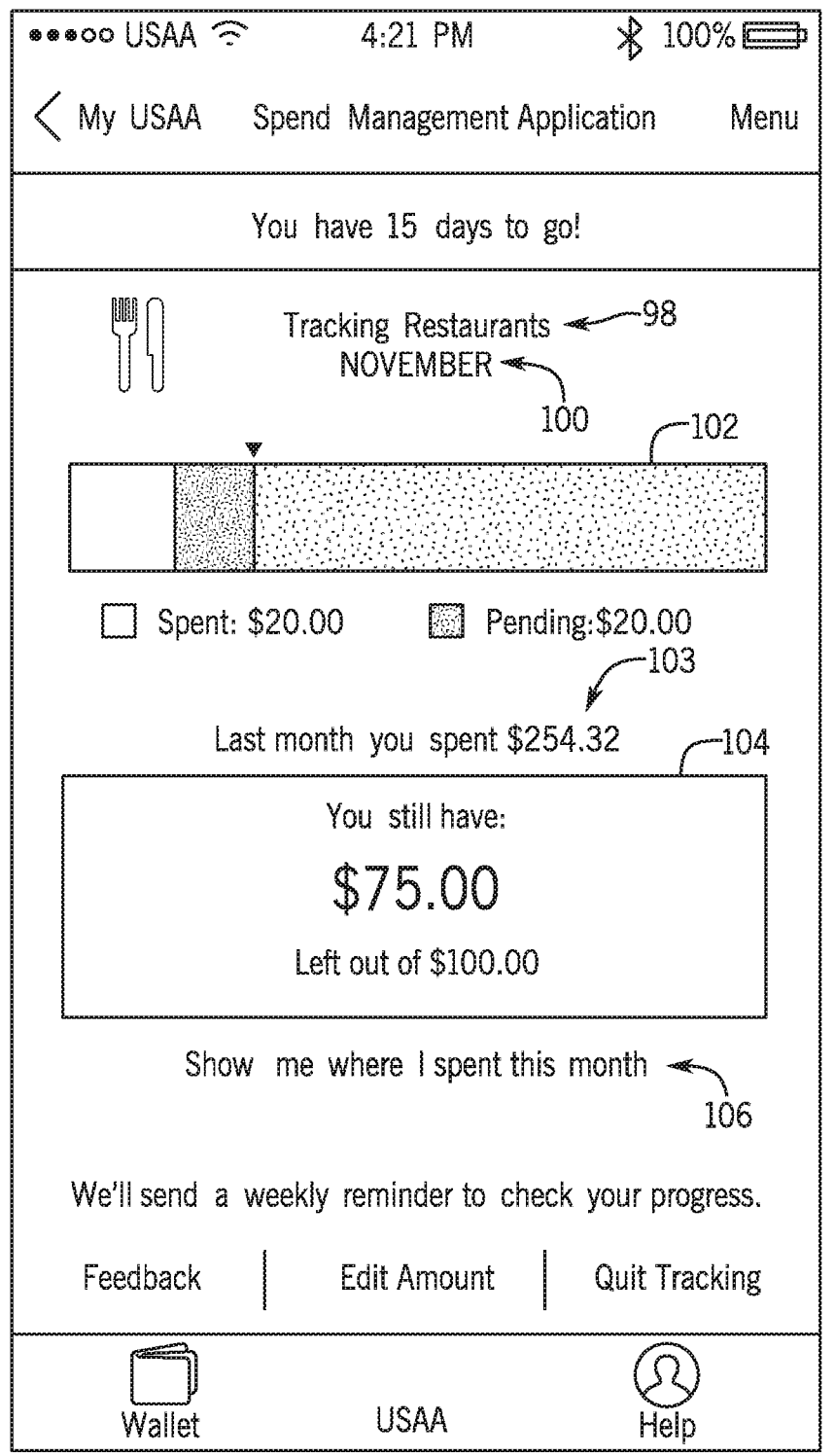
FIG. 11 is a screenshot of a progress tracking page of the spend management application, in accordance with an aspect of the present disclosure.

If the user selects the push notification 94 (e.g., via sliding the push notification 94 off the screen or clicking directly on the push notification 94), the spend management application 12 may display a progress tracking page 96, as depicted in the screenshot of FIG. 11 in accordance with an aspect of the present disclosure. The progress tracking page 96 may display the selected spend category 98 (e.g., restaurants), the timeframe 100 (e.g., November), a bar graph 102 that displays the amount spent, pending amount spent and remaining amount of money left before the target spend amount is met, a historical amount of money spent in a previous timeframe 103 (e.g., "Last month you spent $254.32") for the selected spend category, a panel 104 that displays the amount of money the user has left to spend out of the target spend amount (e.g., "You still have $75 Left out of $100"), and/or a hyperlink 106 to see where the user spent money for the designated timeframe.

Figure 12:
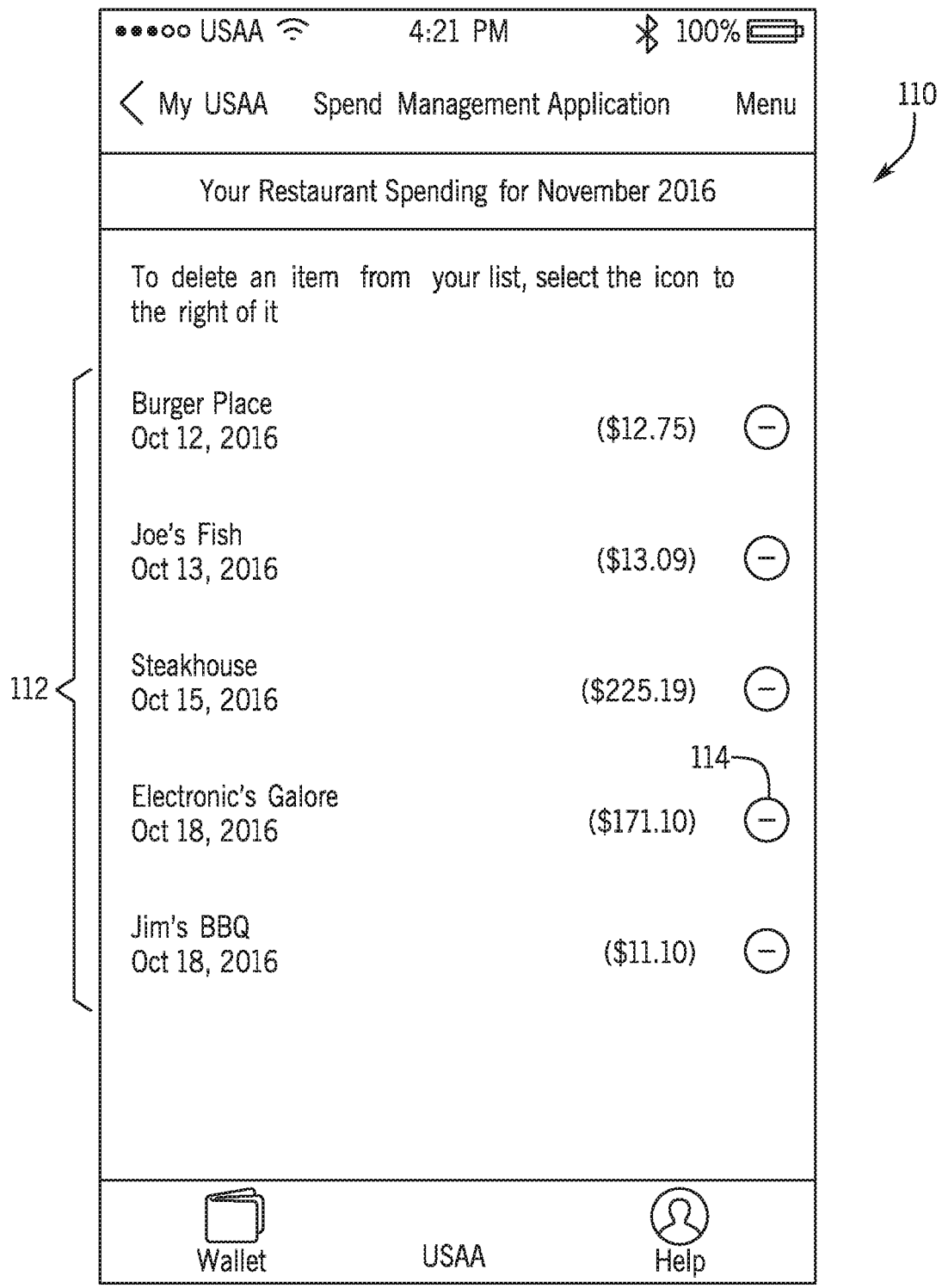
FIG. 12 is a screenshot of a transactions detail page of the spend management application, in accordance with an aspect of the present disclosure.

When the user selects the hyperlink 106, a transactions detail page 110 may be displayed by the spend management application 12, as depicted by the screenshot of FIG. 12 in accordance with an aspect of the present disclosure. As depicted, a list 112 may be displayed that includes the name of each merchant, the date of the transaction, and the amount of money spent at the merchant. However, as depicted "Electronics Galore" is included in the list, which is not a restaurant, so the spend management application 12 may include a function to delete transactions from the list that are erroneously included. The user may select a delete button 114 next to the particular transaction to be deleted to remove that transaction from the list 112.

Figure 13:
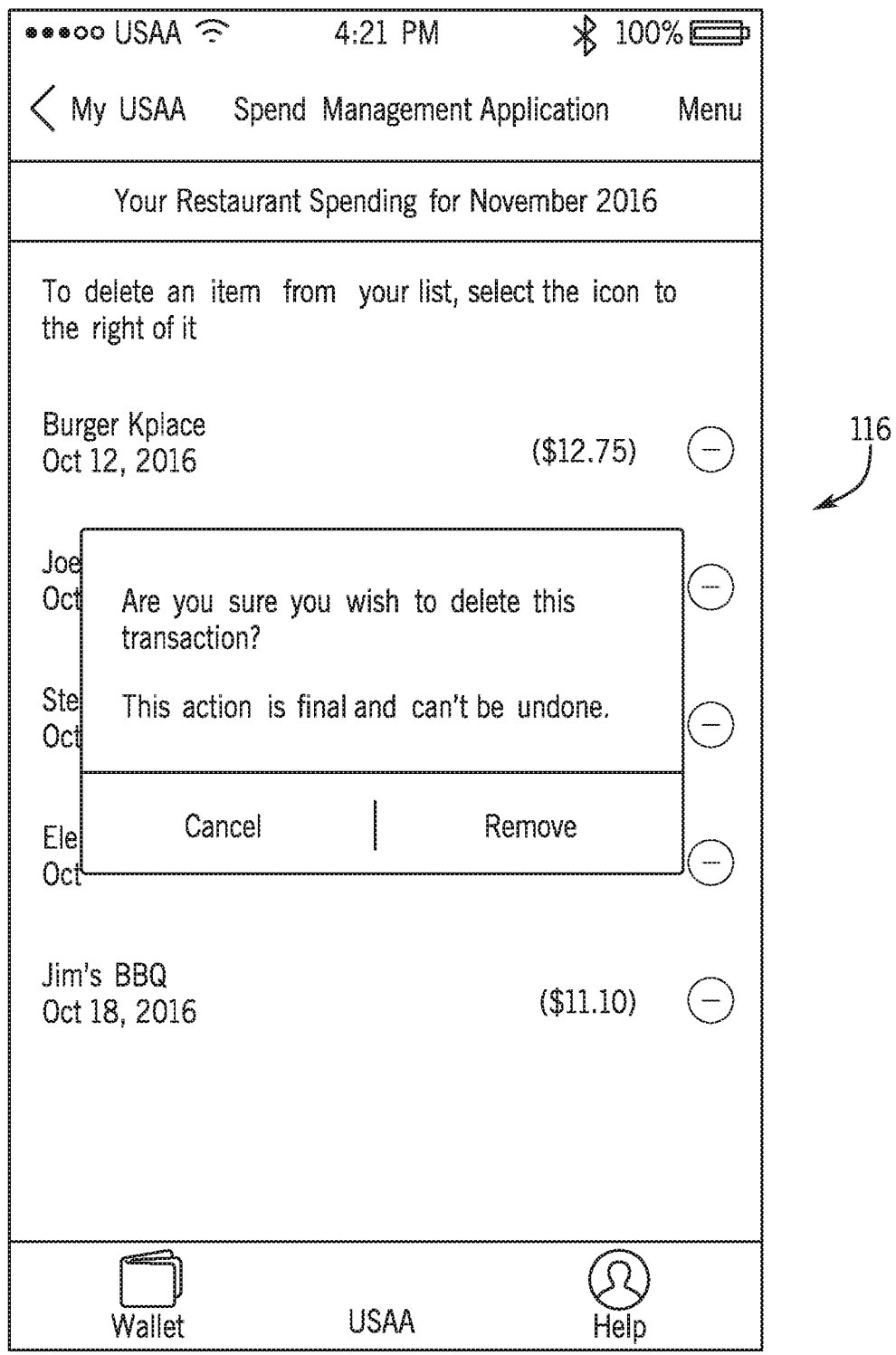
FIG. 13 is a screenshot of a transaction deletion confirmation notification of the spend management application, in accordance with an aspect of the present disclosure.

A transaction deletion confirmation notification 116 may be displayed by the spend management application 12 when the user selects the delete button 114, as depicted in the screenshot of FIG. 13 in accordance with an aspect of the present disclosure. The notification 116 may prompt the user to confirm the deletion of the selected transaction from the list. When the user selects "Remove," the transaction is removed from the list 112. If the user selects "Cancel," the transaction remains on the list 112.

Figure 14:
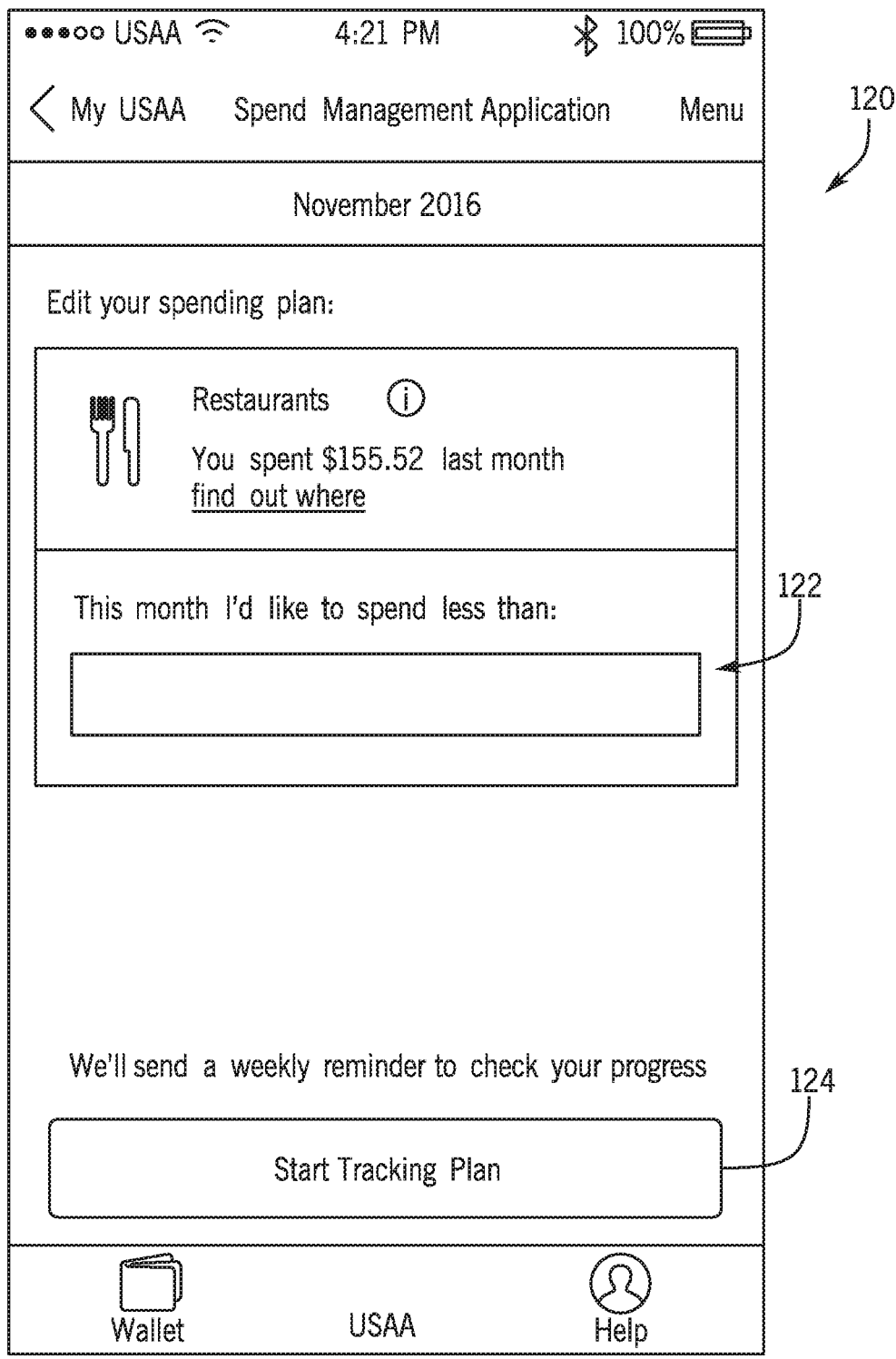
FIG. 14 is a screenshot of an edit target spend amount page of the spend management application, in accordance with an aspect of the present disclosure.

In some embodiments, the spend management application 12 may enable the user to edit the spending plan (e.g., selected timeframe, spend category, and/or target spend amount) that is configured. For example, FIG. 14 is a screenshot of an edit target spend amount page 120 of the spend management application, in accordance with an aspect of the present disclosure. The edit target spend amount page 120 may display the amount of money the user spent on the designated spend category for the previous timeframe and provide an input box 122 for the user to enter the amount of money to spend for the following timeframe. In some embodiments, the spend management application 12 may recommend a target spend amount based on historical spending data, as discussed above. If the user does not update the target spend amount, the previous target spend amount may be the default for the following timeframe. A "Save Spending Plan" button 124 may be displayed and selectable by the user to save an updated target spend amount.

Figure 15:
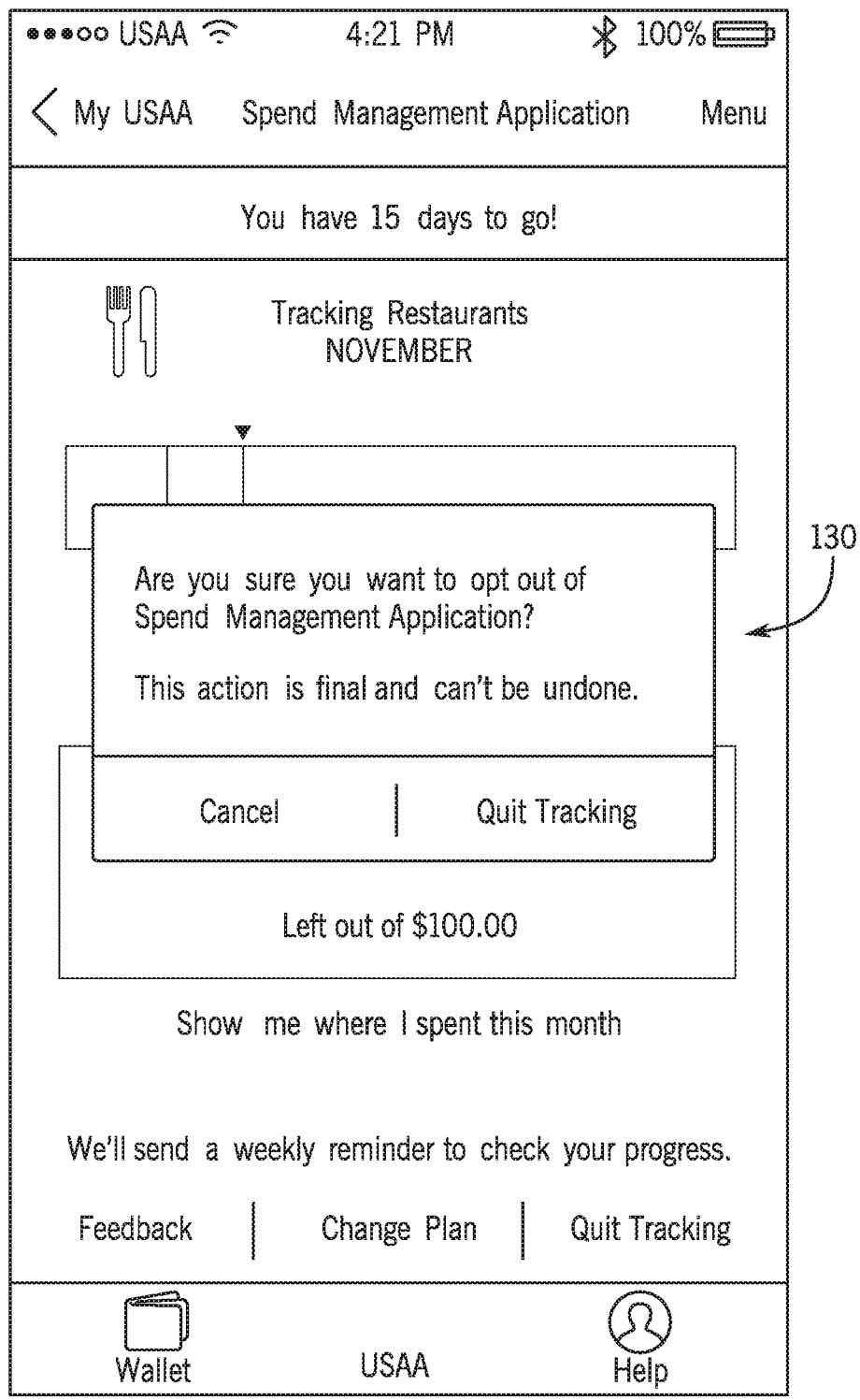
FIG. 15 is a screenshot of a discontinue tracking confirmation of the spend management application, in accordance with an aspect of the present disclosure.

When the user desires to stop monitoring a certain spend category or turn off the monitoring altogether, the user may select to quit tracking and a discontinue tracking confirmation 130 may be displayed by the spend management application 12, as depicted by the screenshot of FIG. 15 in accordance with an aspect of the present disclosure. When the user selects to "Quit Tracking" from the confirmation 130, the spend management application 12 stops tracking the transactions for the selected spend category. If the user selects "Cancel," then the spend management application 12 continues tracking.

Figure 16:
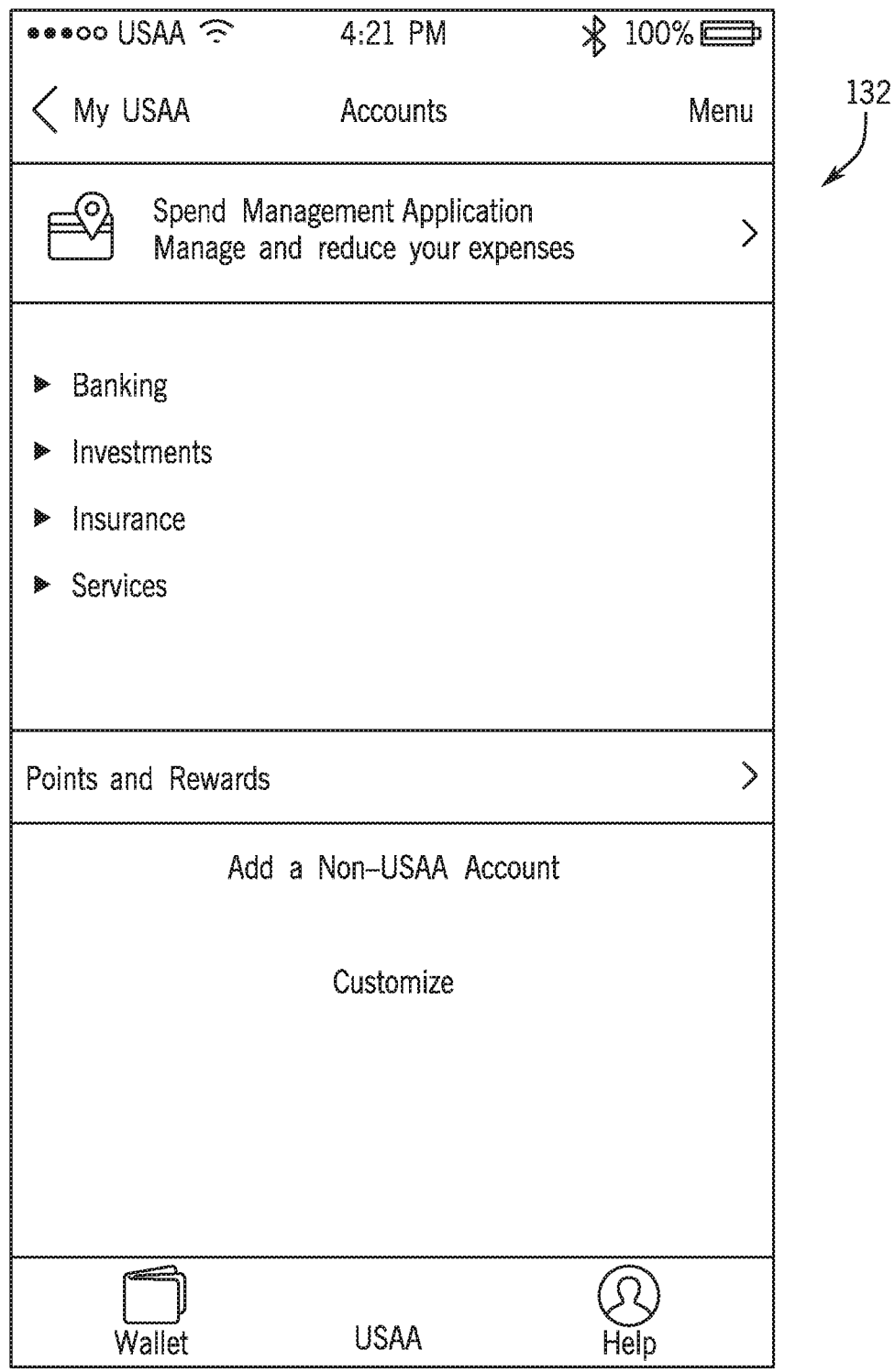
FIG. 16 is a screenshot of an account customization page of the spend management application, in accordance with an aspect of the present disclosure.

In some embodiments, the user may customize accounts that can be accessible to the spend management application 12. For example, FIG. 16 is a screenshot of an account customization page 132 of the spend management application 12, in accordance with an aspect of the present disclosure. The spend management application 12 may enable adding accounts (e.g., banking, investments, insurance, services) associated with a particular financial institution or adding third-party accounts that are not associated with the particular financial institution. It should be noted that the embodiments disclosed herein may be applicable to any account added to the spend management application 12.

Figure 17:
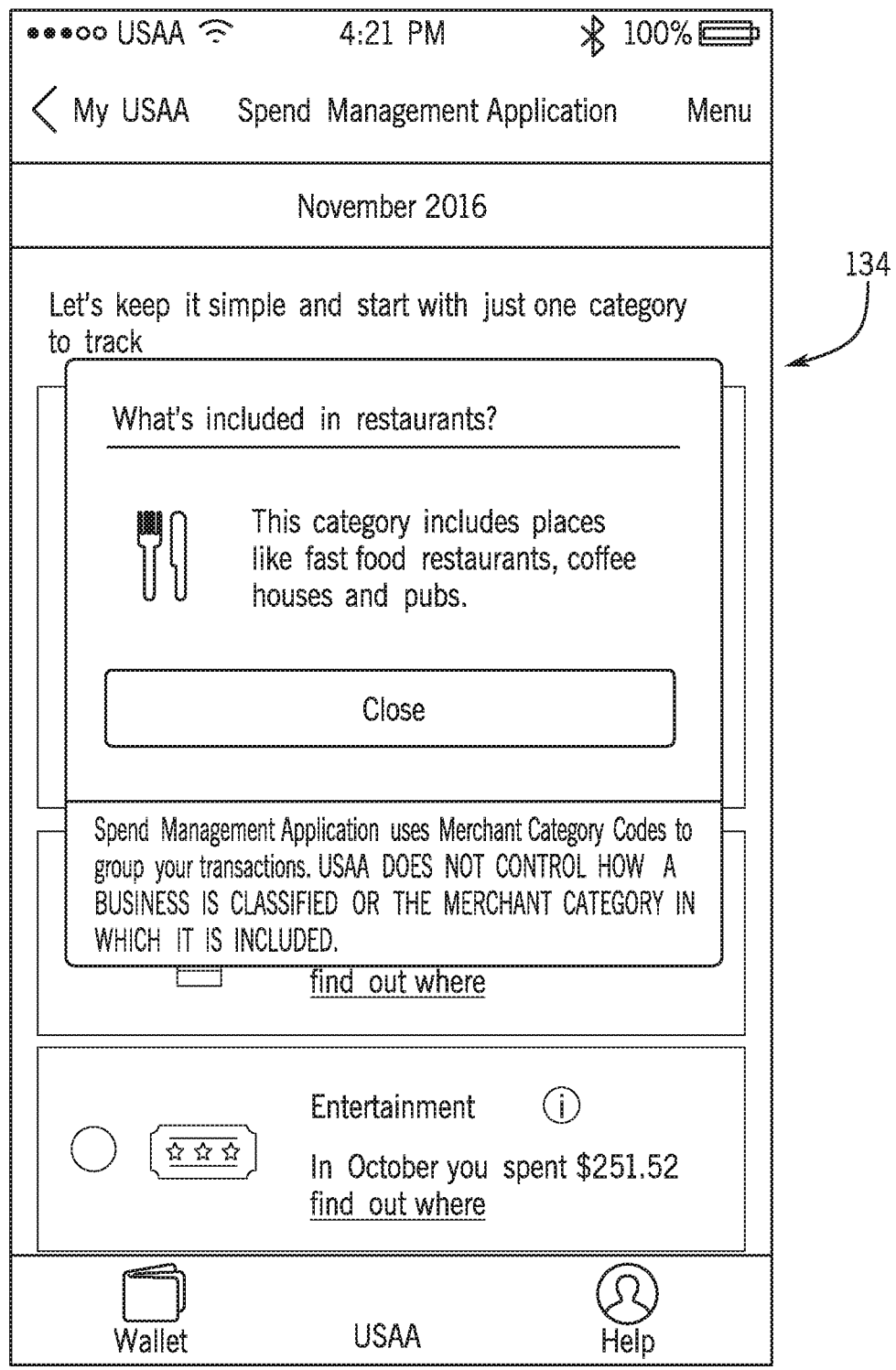
FIG. 17 is a screenshot of a spend category information notification of the spend management application related to restaurants, in accordance with an aspect of the present disclosure.
Figure 18:
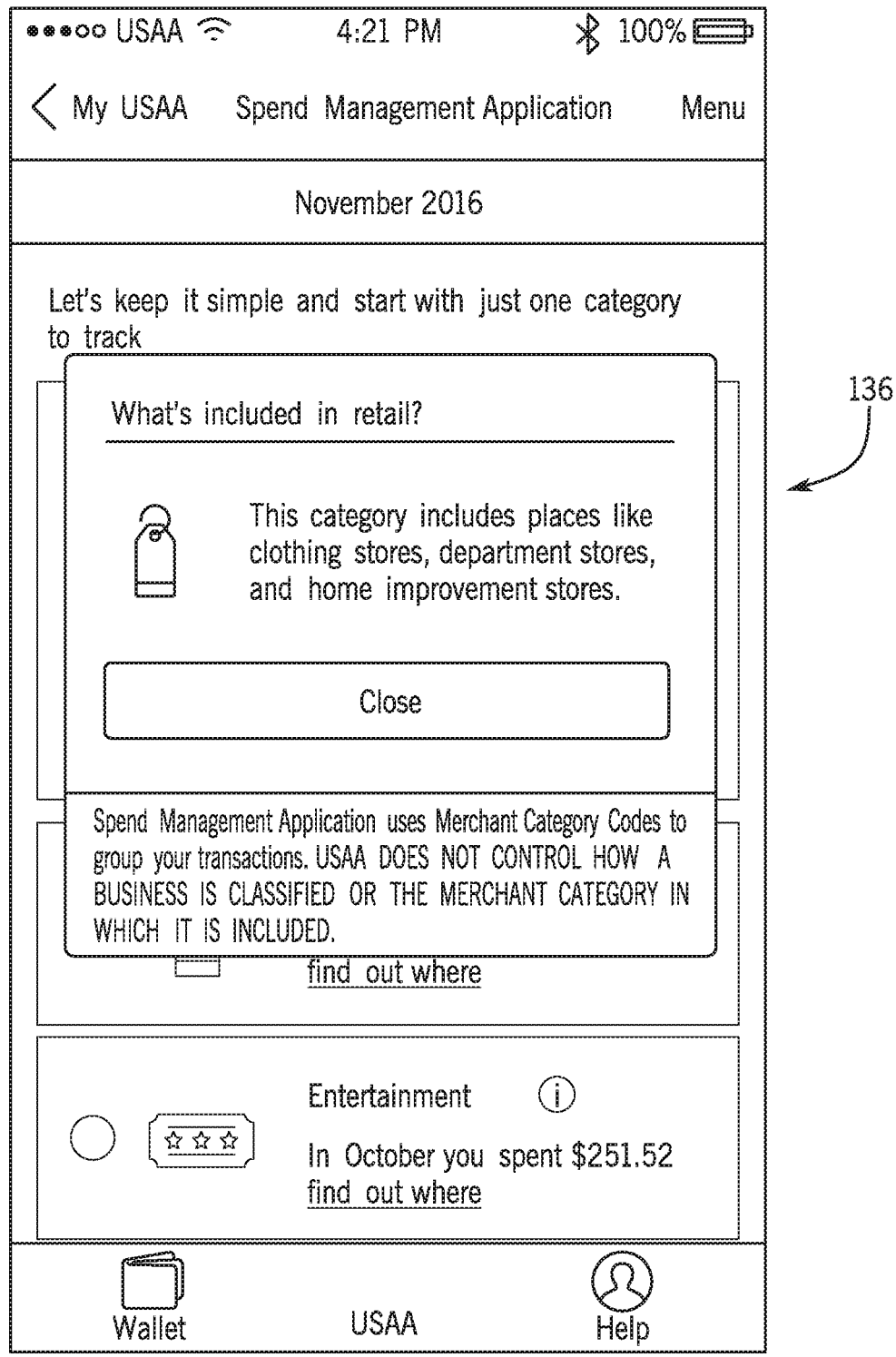
FIG. 18 is a screenshot of a spend category information notification of the spend management application related to retail, in accordance with an aspect of the present disclosure.
Figure 19:
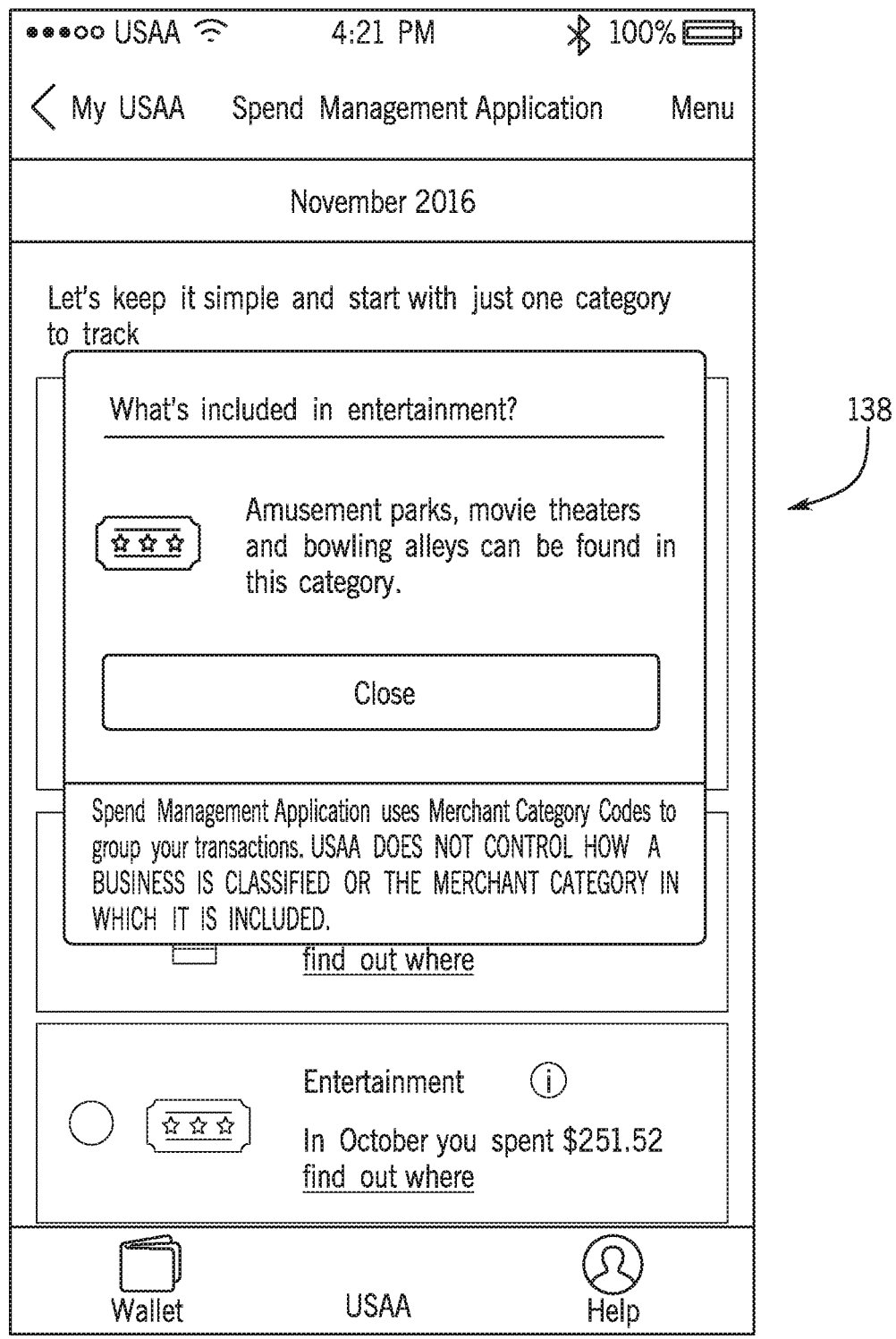
FIG. 19 is a screenshot of a spend category information notification of the spend management application related to entertainment, in accordance with an aspect of the present disclosure.

FIGS. 17-19 depict screenshots of notifications that provide details related to the various spend categories. In particular, FIG. 17 is a screenshot of a spend category information notification 134 of the spend management application 12 related to restaurants, in accordance with an aspect of the present disclosure. As depicted, the notification 134 indicates that the restaurant spend category includes places like fast food restaurants, coffee houses and pubs. FIG. 18 is a screenshot of a spend category information notification 136 of the spend management application 12 related to retail, in accordance with an aspect of the present disclosure. As depicted, the notification 136 indicates that the retail spend category includes places like clothing stores, department stores, and home improvement stores. FIG. 19 is a screenshot of a spend category information notification 138 of the spend management application 12 related to entertainment, in accordance with an aspect of the present disclosure. As depicted, the notification 138 indicates that the entertainment spend category includes places like amusement parks, movie theaters, and bowling alleys. It should be understood that any suitable spend category may be included, such as a travel spend category.

Technical effects of some embodiments of the present disclosure generally enable managing and reducing spending via the spend management application 12, which leverages established merchant category codes for evaluation of business type. In particular, the spend management application 12 enables entry of a target spend amount for a selected spend category over a timeframe for an account. The spend management application 12 enables granular tracking of a single spend category at a time so the user is not overwhelmed with trying to reduce spending for numerous spend categories at once. Further, the spend management application 12 may perform certain actions as the progress toward a target spend amount during a timeframe advances. The actions may include provide alerts, notifications, congratulatory messages, encouraging messages, and/or transferring funds between accounts when the user spends less than the target spend amount. In some embodiments, the spend management application 12 may track historical spending and recommend target spend amounts, among other things.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. One or more non-transitory, computer-readable media storing computer instructions that, when executed by at least one processor, cause the at least one processor to:
   receive a selection of at least one spend category out of a plurality of spend categories to track and a target spend amount for the at least one spend category for a timeframe;
   track one or more transactions associated with the at least one spend category based on filtering the one or more transactions of a plurality of accounts into respective bins based on merchant category codes assigned to the one or more transactions during the timeframe;

display a list of the one or more transactions included in a bin associated with the at least one spend category;

display an alert periodically over a configurable time period during the timeframe, wherein the alert comprises an actual amount spent for the one or more transactions relative to the target spend amount;

receive an input selection to remove a transaction from the bin associated with the at least one spend category that is incorrectly filtered into the bin associated with the at least one spend category or add a transaction to the bin associated with the at least one spend category that was incorrectly filtered out of the bin associated with the at least one spend category, wherein the one or more transactions are updated based on removing the transaction from the bin or adding the transaction to the bin;

monitor an available spend amount based on the actual amount spent relative to the target spend amount for the timeframe;

monitor an overdrawn threshold value of a monitored account of the plurality of accounts based on the available spend amount; and transfer a difference amount from the monitored account to a second account of the plurality of accounts in response to expiration of the timeframe, the actual amount spent being less than the target spend amount, and the available spend amount in the monitored account after transferring the difference amount being above the overdrawn threshold value.

2. The one or more non-transitory, computer readable media of claim 1, wherein the alert comprises a bar graph, wherein the bar graph comprises an indication of a pending amount spent based on tracking the one or more transactions and differences between the target spend amount, the actual amount spent, and the pending amount spent.

3. The one or more non-transitory, computer readable media of claim 2, wherein the alert provides a numerical indication of the difference amount that is available to be spent for the timeframe.

4. The one or more non-transitory, computer readable media of claim 1, wherein the computer instructions, when executed by at least one processor, cause the at least one processor to:

display a congratulatory message in response to expiration of the timeframe and the actual amount spent being less than the target spend amount;

display a message suggesting the target spend amount be reduced in response to the actual amount spent being less than the target spend amount; or both.

5. The one or more non-transitory, computer readable media of claim 1, wherein the merchant category codes indicate a type of business or service provided by a merchant and is associated with a transaction by the merchant at a time the transaction is made.

6. The one or more non-transitory, computer readable media of claim 1, wherein the computer instructions, when executed by the at least one processor, cause the at least one processor to:

track historical spending data for each of the plurality of spend categories based on the one or more transactions; and after the timeframe expires, display a new target spend amount for the at least one spend category based on the historical spending data.

7. The one or more non-transitory, computer readable media of claim 6, wherein the computer instructions, when executed by the at least one processor, cause the at least one processor to display the historical spending data for each of the plurality of spend categories to enable selection of a spend category to track for which more than a threshold of an actual amount was spent.

8. The one or more non-transitory, computer readable media of claim 1, wherein the computer instructions, when executed by the at least one processor, cause the at least one processor to edit the target spend amount during the timeframe based on a received input.

9. The one or more non-transitory, computer readable media of claim 1, wherein the computer instructions, when executed by the at least one processor, cause the at least one processor to:

receive input to quit tracking the at least one spend category;

receive an input selection of a different spend category out of the plurality of spend categories to track and a new target spend amount for the timeframe; and track subsequent transactions associated with the different spend category during the timeframe.

10. The one or more non-transitory, computer readable media of claim 1, wherein the plurality of spend categories comprise entertainment, retail, restaurants, travel, or some combination thereof.

11. A computer-implemented method, comprising:

receiving, by one or more processors of a computing device, inputs related to a selection of at least one spend category out of a plurality of spend categories to track and a target spend amount for the at least one spend category for a timeframe;

tracking, by the one or more processors, historical spending data for each of the plurality of spend categories based at least in part on one or more transactions;

tracking, by the one or more processors, one or more transactions associated with the at least one spend category based on filtering the one or more transactions of a plurality of accounts into respective bins based on merchant category codes assigned to the one or more transactions during the timeframe;

monitoring, by the one or more processors, an available spend amount based on an actual amount spent for the one or more transactions relative to the target spend amount for the timeframe;

monitoring, by the one or more processors, an overdrawn threshold value of a monitored account of the plurality of accounts based on the available spend amount;

transferring, by the one or more processors, a difference amount from the monitored account to a second account of the plurality of accounts in response to expiration of the timeframe, the actual amount spent being less than the target spend amount, and the available spend amount in the monitored account after transferring the difference amount being above the overdrawn threshold value; and after the timeframe expires, displaying, by the one or more processors, a new target spend amount for the at least one spend category based at least in part on the actual amount spent and the historical spending data, wherein the new target spend amount is a percentage less than the actual amount spent.

12. The method of claim 11, comprising displaying, by the one or more processors, an alert that includes the actual amount spent relative to the target spend amount during the timeframe periodically over a time period, wherein the alert comprises representing the actual amount spent relative to the target spend amount as a graph or as a percentage.

13. The method of claim 11, comprising receiving, by the one or more processors, only one spend category and tracking transactions only associated with the only one spend category.

14. A computing system, comprising:
a server configured to provide transaction data associated with a plurality of accounts; and
a computing device communicatively coupled to the server, the computing device comprising one or more processors configured to:
receive the transaction data from the server;
receive a selection of at least one spend category out of a plurality of spend categories to track and a target spend amount for the at least one spend category for a timeframe;
track one or more transactions associated with the at least one spend category based on filtering the transaction data of the plurality of accounts into respective bins associated with each of the plurality of spend categories based on merchant category codes of the transaction data during the timeframe;
monitor an available spend amount based on an actual amount spent for the one or more transactions relative to the target spend amount for the timeframe;
monitor an overdrawn threshold value of a monitored account of the plurality of accounts based on the available spend amount; and
transfer a difference amount from the monitored account to a second account of the plurality of accounts in response to expiration of the timeframe, the actual amount spent being less than the target spend amount, and the available spend amount in the monitored account after transferring the difference amount being above the overdrawn threshold value; and
cause display of an editable display box comprising a new target spend amount that is a percentage less than the actual amount spent in response to receiving an additional selection of the at least one spend category to track after the timeframe expires.

15. The computing system of claim 14, wherein the one or more processors are configured to display an alert on a configurable basis that includes the actual amount spent relative to the target spend amount during the timeframe periodically over a configurable time period and an indication of the difference amount.

16. The one or more non-transitory, computer-readable media of claim 1, wherein the computer instructions that, when executed by at least one processor, cause the at least one processor to track the one or more transactions associated with the at least one spend category to track comprise:
receiving, by the at least one processor, the one or more transactions from a server;
determining, using the at least one processor, the merchant category codes assigned to the one or more transactions;
filtering the one or more transactions into the respective bins based on the merchant category codes assigned to the one or more transactions; and
determining the actual amount spent relative to the target spend amount, wherein determining the actual amount spent relative to the target spend amount comprises:
retrieving transactions from one or more of the respective bins, wherein the one or more of the respective bins correspond to the at least one spend category; and
summing the transactions from the one or more of the respective bins.

17. The one or more non-transitory, computer readable media of claim 1, wherein the computer instructions, when executed by the at least one processor, cause the processor to transfer the difference amount between the actual amount spent and the target spend amount after the timeframe from the monitored account to the second account in response to determining that the monitored account comprises the difference amount.

18. The one or more non-transitory, computer readable media of claim 7, wherein the new target spend amount for the at least one spend category is a percentage less than the actual amount spent.

19. The method of claim 11, comprising:
displaying, by the one or more processors, a list of the one or more transactions included in a bin associated with the at least one spend category;
receive an input selection to remove a transaction from the bin associated with the at least one spend category that is incorrectly filtered into the bin associated with the at least one spend category or add a transaction to the bin associated with the at least one spend category that was incorrectly filtered out of the bin associated with the at least one spend category.

20. The computing system of claim 14, wherein the one or more processors are configured to:
track historical spending data for the at least one spend category based on the one or more transactions; and
after the timeframe expires, display a new target spend amount for the at least one spend category based on the historical spending data.

* * * * *